(12) United States Patent
Kreitzer et al.

(10) Patent No.: US 7,145,729 B2
(45) Date of Patent: Dec. 5, 2006

(54) FOLDABLE PROJECTION LENSES

(75) Inventors: Melvyn H. Kreitzer, Cincinnati, OH (US); Jacob Moskovich, Cincinnati, OH (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 11/194,322

(22) Filed: Aug. 1, 2005

(65) Prior Publication Data

US 2006/0028738 A1 Feb. 9, 2006

Related U.S. Application Data

(60) Provisional application No. 60/598,611, filed on Aug. 4, 2004.

(51) Int. Cl.
*G02B 3/00* (2006.01)

(52) U.S. Cl. ...................... 359/649; 359/708

(58) Field of Classification Search ......... 359/649–651
See application file for complete search history.

(56) References Cited

U.S. PATENT DOCUMENTS

| | | | |
|---|---|---|---|
| 5,313,330 A | 5/1994 | Betensky | |
| 5,625,495 A | 4/1997 | Moskovich | |
| 5,900,987 A | 5/1999 | Kreitzer et al. | |
| 6,111,703 A | 8/2000 | Hozumi | |
| 6,195,209 B1 | 2/2001 | Kreitzer et al. | |
| 6,324,014 B1 * | 11/2001 | Moskovich | 359/651 |
| 6,417,971 B1 * | 7/2002 | Moskovich | 359/649 |
| 6,445,512 B1 * | 9/2002 | Moskovich | 359/757 |
| 6,476,974 B1 | 11/2002 | Kreitzer | |
| 6,563,650 B1 | 5/2003 | Moskovich | |
| 6,765,731 B1 | 7/2004 | Cannon | |
| 6,853,493 B1 | 2/2005 | Kreitzer | |
| 2002/0141072 A1 | 10/2002 | Moskovich | |
| 2004/0130799 A1 | 7/2004 | Kreitzer | |

FOREIGN PATENT DOCUMENTS

| | | |
|---|---|---|
| WO | WO00/67059 | 11/2000 |
| WO | WO02/071124 | 9/2002 |
| WO | WO04/063787 | 7/2004 |

OTHER PUBLICATIONS

J. Hoogland, "The Design of Apochromatic Lenses," in *Recent Development in Optical Design*, R.A. Ruhloff editor, Perkin-Elmer Corporation, Norwalk, CT, 1968, pp. 6-1 to 6-7.

* cited by examiner

*Primary Examiner*—Jordan M. Schwartz
(74) *Attorney, Agent, or Firm*—George W. Jonas

(57) ABSTRACT

Projection lenses for use with pixelized panels (PP) are provided. The projection lenses have a first unit (U1) separated from a positive second unit (U2) by a distance sufficient to accept a reflective surface (RS) for folding the lens' optical axis. The lenses are telecentric on the short conjugate side, have a large field of view in the direction of the long conjugate, and have low aberration levels. By using negative lens elements ($L_{U1/N1}$ and $L_{U1/N2}$) composed of plastic materials having large positive Q-values at the long conjugate side of the first lens unit (U1), the lenses can achieve low levels of lateral color, including low levels of secondary lateral color, with reduced cost compared to lenses which employ anomalous dispersion glasses in the first lens unit.

34 Claims, 16 Drawing Sheets

FOLDABLE PROJECTION LENSES

CROSS REFERENCE TO RELATED APPLICATION

This application claims the benefit under 35 USC § 119(e) of U.S. Provisional Application No. 60/598,611, filed on Aug. 4, 2004, and entitled FOLDABLE PROJECTION LENSES, the contents of which are incorporated herein in their entirety.

This invention relates to projection lenses and, in particular, to foldable, telecentric projection lenses for use in forming an image of an object composed of pixels, such as, a DMD, a reflective LCD, a transmissive LCD, or the like. The lenses are particularly well-suited for use with DMD panels.

BACKGROUND OF THE INVENTION

A. Definitions

As used in this specification and in the claims, the following terms shall have the following meanings:

(1) Telecentric

Telecentric lenses are lenses which have at least one pupil at infinity. In terms of principal rays, having a pupil at infinity means that the principal rays are parallel to the optical axis (a) in object space, if the entrance pupil is at infinity, or (b) in image space, if the exit pupil is at infinity.

In practical applications, a telecentric pupil need not actually be at infinity since a lens having an entrance or exit pupil at a sufficiently large distance from the lens' optical surfaces will in essence operate as a telecentric system. The principal rays for such a lens will be substantially parallel to the optical axis and thus the lens will in general be functionally equivalent to a lens for which the theoretical (Gaussian) location of the pupil is at infinity.

Accordingly, as used herein, the terms "telecentric" and "telecentric lens" are intended to include lenses which have a pupil at a long distance from the lens' elements, and the term "telecentric pupil" is used to describe such a pupil at a long distance from the lens' elements. For the projection lenses of the invention, the telecentric pupil distance will in general be at least about 20 times the lens' focal length.

(2) Effective Back Focal Length

The effective back focal length (BFL) of a projection lens/pixelized panel combination is the distance between the front surface of the pixelized panel and the vertex of the back surface of the rearward-most lens element of the projection lens which has optical power when (1) the image of the pixelized panel is located at infinity and (2) the projection lens is located in air, i.e., the space between the rearward-most lens element of the projection lens and the pixelized panel is filled with air as opposed to the glasses making up the prisms, beam splitters, etc. normally used between a projection lens and a pixelized panel.

(3) Q-Value

As described in J. Hoogland, "The Design of Apochromatic Lenses," in *Recent Development in Optical Design*, R. A. Ruhloff editor, Perkin-Elmer Corporation, Norwalk, Conn., 1968, pages 6-1 to 6-7, the contents of which are incorporated herein by reference, Q-values can be calculated for optical materials and serve as a convenient measure of the partial dispersion properties of the material.

Hoogland's Q-values are based on a material's indices of refraction at the e-line (546 nanometers), the F' line (480 nanometers), and the C' line (643.8 nanometers). The wavelengths used herein, both in the specification and in the claims, are the d line (587.56 nanometers), the F line (486.13 nanometers), and the C line (656.27 nanometers).

More particularly, as described in Hoogland, the Q-value for a lens element is determined using the indices of refraction $N_d$, $N_F$, and $N_C$ of the material making up the element at the d, F, and C lines, respectively, and the equation:

$$Q=(y-y_n)\times 10^6$$

where y is given by:

$$y=(N_F-N_d)/(N_d-1)$$

and $y_n$ is determined from an equation of the form:

$$y_n=ax+b$$

evaluated at the x-value for the material making up the lens element, where x is given by:

$$x=(N_F-N_C)/(N_d-1)$$

and a and b are determined using x and y values for SK16 and SF2.

(4) V-Value

V-values (also known as Abbe constants) are for the d, F, and C lines and are given by:

$$V=(N_d-1)/(N_F-N_C)$$

(5) N-Value

Indices of refraction (N-values) are for the d-line (587.56 nanometers) in Table 6. All focal lengths and other calculated values which depend on a single value for the index of refraction for individual elements are for the e-line (546.1 nanometers).

(6) Lens Element F-Number

The f-number of a lens element ($F/\#_{element}$) is the ratio of the element's focal length to its maximum clear aperture, i.e., the largest of its long conjugate and short conjugate clear apertures.

(7) Vignetting

The vignetting of a projection lens in percent is defined as 100 minus 100 times the ratio, in the long conjugate focal plane, of the illuminance at the full field to the illuminance on-axis at the projection lens' working f-number. Since projection lenses normally do not include an adjustable iris and are used "wide open," the working f-number will typically be the full aperture f-number.

B. Projection Systems

Image projection systems are used to form an image of an object, such as a display panel, on a viewing screen. Such systems can be of the front projection or rear projection type, depending on whether the viewer and the object are on the same side of the screen (front projection) or on opposite sides of the screen (rear projection).

FIG. 6 shows in simplified form the basic components of an image projection system 17 for use with a pixelized imaging device (also known in the art as a "digital light valve"). In this figure, 10 is an illumination system, which comprises a light source 11 and illumination optics 12 which transfer some of the light from the light source towards the screen, 13 is the imaging device, and 14 is a projection lens which forms an enlarged image of the imaging device on viewing screen 15. For front projection systems, the viewer will be on the left side of screen 15 in FIG. 6, while for rear projection systems, the viewer will be on the right side of the screen.

For ease of presentation, FIG. 6 shows the components of the system in a linear 5, arrangement. For a reflective imaging device and, in particular, for a DMD imaging device of the type with which the present invention will typically be used, the illumination system is arranged so that light from that system reflects off of the imaging device, i.e., the light impinges on the front of the imaging device as opposed to the back of the device as shown in FIG. 6. Also, for such imaging devices, one or more prism assemblies (see "PR" in FIGS. 1A, 2A, 3A, 4A, 4B, and 5) will be located in front of the imaging device and will receive illumination light from the illumination system and will provide imaging light to the projection lens. In addition, for rear projection systems which are to be housed in a single cabinet, one or more mirrors are often used between the projection lens and the screen to fold the optical path and thus reduce the system's overall size.

The linear arrangement shown in FIG. 6 can also be modified in the case of a transmissive imaging device. Specifically, in this case, the optical path between the imaging device and the screen can include two folds to reduce the overall size of the cabinet used to house the system, e.g., a first fold mirror can be placed between imaging device 13 and projection lens 14 and a second fold mirror can be placed between the projection lens and screen 15.

Image projection systems preferably employ a single projection lens which forms an image of: (1) a single imaging device which produces, either sequentially or simultaneously, the red, green, and blue components of the final image; or (2) three imaging devices, one for red light, a second for green light, and a third for blue light. Rather than using one or three imaging devices, some image projection systems have used two or up to six imagers. Also, for certain applications, e.g., large image rear projection systems, multiple projection lenses are used, with each lens and its associated imaging device(s) producing a portion of the overall image. Irrespective of the details of the application, the projection lens generally needs to have a relatively long effective back focal length to accommodate the prisms, beam splitters, and other components normally used with pixelized panels. In the preferred embodiments of the present invention, a single projection lens is used to form an image of a single imaging device, e.g., a DMD panel. For this application, the projection lens needs to have a relatively long effective back focal length to accommodate the one or more prism assemblies used with such a panel (see above).

A particularly important application of projection systems employing pixelized panels is in the area of rear projection systems which can be used as large screen projection televisions (PTVs) and/or computer monitors. To compete effectively with the established cathode ray tube (CRT) technology, projection systems based on pixelized panels need to be smaller in size and lower in weight than CRT systems having the same screen size.

C. Optical Performance

To display images having a high information content (e.g., to display data), a microdisplay must have a large number of pixels. Since the devices themselves are small, the individual pixels are small, a typical pixel size ranging from 17µ for DMD displays to approximately 8µ or even less for reflective LCDs. This means that the projection lenses used in these systems must have a very high level of correction of aberrations. Of particular importance is the correction of chromatic aberrations and distortion.

A high level of chromatic aberration correction is important because color aberrations can be easily seen in the image of a pixelized panel as a smudging of a pixel or, in extreme cases, the complete dropping of a pixel from the image. Lateral color, i.e., the variation of magnification with color, is particularly troublesome since it manifests itself as a decrease in contrast, especially at the edges of the field. In extreme cases, a rainbow effect in the region of the full field can be seen.

In projection systems employing CRTs a small amount of (residual) lateral color can be compensated for electronically by, for example, reducing the size of the image produced on the face of the red CRT relative to that produced on the blue CRT. With a pixelized panel, however, such an accommodation cannot be performed because the image is digitized and thus a smooth adjustment in size across the full field of view is not possible. A higher level of lateral color correction, including correction of secondary lateral color, is thus needed from the projection lens.

The use of a pixelized panel to display data leads to stringent requirements regarding the correction of distortion. This is so because good image quality is required even at the extreme points of the field of view of the lens when viewing data. As will be evident, an undistorted image of a displayed number or letter is just as important at the edge of the field as it is at the center.

Moreover, projection lenses are often used with offset panels. In particular, in the case of DMDs, an offset is typically needed to provide the appropriate illumination geometry and to allow the dark-field light to miss the entrance pupil of the lens. This dark-field light corresponds to the off position of the pixels of the DMD.

When a panel is offset, the distortion at the viewing screen does not vary symmetrically about a horizontal line through the center of the screen but can increase monotonically from, for example, the bottom to the top of the screen. This effect makes even a small amount of distortion readily visible to the viewer.

Low distortion and a high level of color correction are particularly important when an enlarged image of a WINDOWS type computer interface is projected onto a viewing screen. Such interfaces with their parallel lines, bordered command and dialog boxes, and complex coloration, are in essence test patterns for distortion and color. Users readily perceive and object to even minor levels of distortion or color aberration in the images of such interfaces.

In addition to high levels of color and distortion correction, projection lenses for use with pixelized panels need to have low levels of ghost generation, especially when the pixelized panel is of the reflective type, e.g., a DMD or reflective LCD.

As known in the art, ghosts can be generated by image light reflecting back towards the object from one of the lens surfaces of a projection lens. Depending upon the shape of the lens surface and its location relative to the object, such reflected light can be re-reflected off of the object so that it reenters the projection lens and is projected onto the screen along with the desired image. Such ghost light always reduces contrast at least to some extent. In extreme cases, a second image can actually be seen on the screen.

Because the operation of DMDs and reflective LCDs depend upon their ability to reflect light efficiently, projection systems employing panels of these types are particularly susceptible to ghost problems. Ghosts can also be generated by light reflecting backwards off of one lens surface and then being re-reflected in a forward direction by a second lens surface. When reflective pixelized panels are used, ghosts generated by reflections from two lens surfaces are generally less troublesome than ghosts generated by a lens surface/pixelized panel combination.

As is well-known in the art, field dependent aberrations increase markedly at the corners of a projected image and thus one way of reducing aberrations is to include vignetting surfaces in a projection lens which selectively remove abberated light directed towards the corners of the image. Although successful in reducing aberrations, this approach lessens the amount of light which reaches the corners and thus produces an image whose brightness is lower in the corners than at the center. Users can interpret such reductions in intensity as indicative of a lower quality projection system. It is thus desirable to minimize the drop-off in light intensity at the corners of an image, e.g., at the full field in the long conjugate focal plane, introduced by the projection lens.

D. Cost

Moskovich, U.S. Pat. No. 5,625,495, entitled "Telecentric Lens Systems For Forming an Image of an Object Composed of Pixels," and Kreitzer et al., U.S. Pat. No. 6,195,209, entitled "Projection Lenses Having Reduced Lateral Color for Use with Pixelized Panels," the contents of both of which are incorporated herein by reference, describe the use of anomalous dispersion glasses (also known as "abnormal partial dispersion" glasses) and/or optical materials having particular Q-values to correct lateral color. The present invention employs the techniques of these patents, but with the added constraint that the cost of the lens is reduced while still maintaining high performance and, indeed, in some embodiments, performance levels not previously achieved even with more expensive designs.

The use of special glasses in a projection lens can rapidly increase the lens' cost, especially if such glasses are used in large lens elements. For example, the anomalous dispersion glass S-FPL51, which has a Q-value of 120.0, currently costs about $95 per pound. For comparison, standard flint and crown glasses, such as S-TIM2 and S-BSL7, currently cost around $30 and $10 per pound, respectively.

Cost not only rises when a glass with special dispersion properties is used, but also varies with the glass' index of refraction. For example, the breakpoint between inexpensive and expensive flint glasses is around N=1.9, with flint glasses having indices below this value being less expensive. For crown glasses, on the other hand, the breakpoint is around N=1.6, with crown glasses having indices above this value being less expensive.

Compared to glasses and, in particular, compared to glasses having special dispersion properties, plastic materials are generally much less expensive. In particular, as illustrated by the examples presented below, in accordance with the invention, it has been found that optical plastics, such as acrylics, can be used to provide high positive Q-values for the large lens elements of a projection lens, and thus low levels of secondary lateral color, at a fraction of the cost of a high +Q glass such as S-FPL51. The cost reductions achieved in this way are especially important for projection lenses that are to be used in consumer products, where price competition is most intense.

E. Telecentricity

The above-mentioned pixelized panels and, in particular, DMDs, typically require that the light beam from the illumination system has a near-normal angle of incidence upon the display.

In terms of the projection lens, this translates into a requirement that the lens has a telecentric entrance pupil, i.e., the projection lens must be telecentric in the direction of its short imaging conjugate where the object (pixelized panel) is located. This makes the lens asymmetric about the aperture stop which makes the correction of lateral color more difficult.

F. Cabinet Size

For rear projection systems, there is an ever increasing demand for smaller cabinet sizes (smaller footprints).

In terms of the projection lens, this translates into a requirement that the lens has a wide field of view in the direction of the image (screen). Increases in the field of view from, for example, 80° to, for example, 94°, can be of substantial significance to manufacturers of projection televisions. This is so because such an increase in the field of view of the projection lens can allow the TV manufacturer to reduce the dimensions of its cabinet by an inch or more. A smaller cabinet, in turn, makes a projection television more desirable in the highly competitive consumer market for PTVs.

The requirement for a large field of view makes it even more difficult to correct the lateral color of the lens. This is especially so when combined with the requirement for a relatively long effective back focal length which itself makes it more difficult to correct lateral color. Also, as mentioned above, the requirement for telecentricity is a third factor which makes the correction of lateral color challenging.

In addition to increasing the field of view, cabinet sizes can also be reduced through the use of a folded projection lens, i.e., a lens having an internal reflective surface (e.g. a mirror or prism) which allows the lens to have an overall form which is easier to integrate with the other components of the projection system and is more compact. In terms of lens design, the use of such a reflective surface means that two of the lens units making up the projection lens must be separated by a distance which is sufficiently long to receive the reflective surface. A construction of this type makes it more difficult to correct the aberrations of the system, especially if the lens is to include only a relatively small number of lens elements as is desired to reduce the cost, weight, and complexity of the projection lens.

Achieving a relatively long back focal length, a wide field of view in the direction of the lens' long conjugate, telecentricity, and a folded configuration, while still maintaining high levels of aberration correction with minimal vignetting and low levels of ghost generation, is particularly challenging since these various requirements tend to work against one another. To do so while reducing the overall cost of the projection lens is even more demanding. As illustrated by the examples presented below, the present invention in its preferred embodiments provides projection lenses which simultaneously satisfy these competing design criteria.

SUMMARY OF THE INVENTION

In accordance with a first aspect, the invention provides a projection lens for forming an enlarged image of a pixelized panel (PP) on a screen, said projection lens having an optical axis, a long conjugate side (image or screen side), a short conjugate side (object or pixelized panel side), and an effective focal length $f_0$, said lens, in order from the long conjugate side to the short conjugate side, comprising:

(I) a first lens unit (U1) comprising a plurality of lens elements one of which has an optical surface $S_1$ which constitutes the short conjugate end of the first lens unit, said plurality of lens elements having a minimum clear aperture $CA_{min/U1}$ and comprising:

(A) a lens element $L_{U1/N1}$ which:
(i) comprises at least one aspheric surface,
(ii) comprises a plastic material having a V-value $V_{U1/N1}$ and a Q-value $Q_{U1/N1}$,
(iii) has a focal length $f_{U1/N1}$,
(iv) has a lens element f-number $F/\#_{U1/N1}$, and (v) has a short conjugate surface which is concave towards the short conjugate side;

(B) a lens element $L_{U1/N2}$ (e.g., a biconcave lens element) which:
   (i) comprises at least one aspheric surface,
   (ii) comprises a plastic material having a V-value $V_{U1/N2}$ and a Q-value $Q_{U1/N2}$,
   (iii) has a focal length $f_{U1/N2}$, and
   (iv) has a lens element f-number $F/\#_{U1/N2}$; and (C) a lens element $L_{U1/P}$ (e.g., a lens element which satisfies the relationship $N_{U1/P} \geq 1.6$ and/or the relationship $V_{U1/P} \leq 75$) which:
   (i) comprises a glass material having a Q-value $Q_{U1/P}$, and
   (ii) has a focal length $f_{U1/P}$; and (II) a second lens unit having a positive power, said lens unit comprising a plurality of lens elements one of which has an optical surface $S_2$ which constitutes the long conjugate end of the second lens unit, said plurality of lens elements having a maximum clear aperture $CA_{max/U2}$ and comprising a lens element $L_{U2/P1}$ which:
   (i) comprises a glass material have a Q-value $Q_{U2/P1}$, and
   (ii) has a focal length $f_{U2/P1}$;

wherein:
(a) the first and second lens units are the only lens units of the projection lens;
(b) the first lens unit does not include any lens elements which comprise a glass material having a Q-value greater than 50.0 (preferably, the first lens unit does not include any lens elements which comprise a glass material having a Q-value greater than 20.0);
(c) the projection lens has a field of view in the direction of the long conjugate which is greater than or equal to 85 degrees and preferably greater than or equal to 90 degrees;
(d) the projection lens is telecentric on the short conjugate side;
(e) the projection lens has an effective back focal length BFL which satisfies the relationship:

$BFL/f_0 \geq 2.0$ (preferably $\geq 2.5$);

(f) the projection lens has a mechanical spacing $S_{1-2}$ between $S_1$ and $S_2$ which satisfies the relationship:

$S_{1-2}/f_0 \geq 3.5$ (preferably $\geq 5.0$, more preferably $\geq 7.0$)

where the mechanical spacing is the smaller of the center-to-center distance and the edge-to-edge distance between $S_1$ and $S_2$ for an unfolded optical axis; and (g) $f_{U1/N1}$, $F/\#_{U1/N1}$, $V_{U1/N1}$, $Q_{U1/N1}$, $f_{U1/N2}$, $F/\#_{U1/N2}$, $V_{U1/N2}$, $Q_{U1/N2}$, $f_{U1/P}$, $Q_{U1/P}$, $f_{U2/P1}$, $Q_{U2/P1}$, $C_{min/U1}$, and $C_{max/U2}$ satisfy the relationships:

$f_{U1/N1} \leq 0$ ($f_{U1/N1}$ preferably satisfies the relationship $|f_{U1/N1}|/f_0 \leq 10.0$ and more preferably the relationship $|f_{U1/N1}|/f_0 \leq 7.0$);

$F/\#_{U1/N1} \leq 1.0$ (preferably $\leq 0.7$);

$V_{U1/N1} \geq 45$;

$Q_{U1/N1} \geq 100.0$ (e.g., equal to 120.0);

$f_{U1/N2} < 0$ ($f_{U1/N2}$ preferably satisfies the relationship $|f_{U1/N2}|/f_0 \leq 10.0$ and more preferably the relationship $|f_{U1/N2}|/f_0 \leq 7.0$);

$F/\#_{U1/N2} \leq 1.5$ (preferably $\leq 1.3$);

$V_{U1/N2} \geq 45$;

$Q_{U1/N2} \geq 100.0$ (e.g., equal to 120.0);

$f_{U1/P} > 0$ ($f_{U1/P}$ preferably satisfies the relationship $f_{U1/P}/f_0 \leq 10.0$ and more preferably the relationship $f_{U1/P}/f_0 \leq 6.0$);

$Q_{U1/P} \leq 50.0$ (preferably $\leq 20.0$);

$f_{U2/P1} > 0$ ($f_{U2/P1}$ preferably satisfies the relationship $f_{U2/P1}/f_0 \leq 7.0$ and more preferably the relationship $f_{U2/P1}/f_0 \leq 5.0$);

$Q_{U2/P1} \geq 35.0$ (preferably $\geq 45.0$, more preferably $\geq 100.0$);

and $CA_{max/U2}/CA_{min/U1} \leq 1.0$ (preferably $\leq 0.9$).

By satisfying the last relationship, i.e., by having $C_{max/U2}/C_{min/U1} \leq 1.0$ and, preferably $\leq 0.9$, the cost of the lens is reduced since the relatively expensive high +Q glass element(s) of the second lens unit will be small compared to the lens elements of the first lens unit.

In certain embodiments, the plurality of lens elements of the first lens unit can comprise a lens element $L_{U1/N3}$ which:
   (i) comprises a glass material, and
   (ii) has a focal length $f_{U1/N3}$, where $f_{U1/N3}$ satisfies the relationship:

$f_{U1/N3} < 0$ ($f_{U1/N3}$ preferably satisfies the relationship $|f_{U1/N3}|/f_0 \geq 5.0$ and more preferably the relationship $|f_{U1/N3}|/f_0 \geq 9.0$).

The $L_{U1/N3}$ lens element can also have an index of refraction $N_{U1/N3}$ which satisfies the relationship:

$N_{U1/N3} \leq 1.9$.

In certain embodiments, the plurality of lens elements of the second lens unit can comprise a lens element $L_{U2/P2}$ which:
   (i) comprises a glass material having a Q-value $Q_{U2/P2}$, and
   (ii) has a focal length $f_{U2/P2}$, where $f_{U2/P2}$ and $Q_{U2/P2}$ satisfy the relationships:

$f_{U2/P2} > 0$ ($f_{U2/P2}$ preferably satisfies the relationship $f_{U2/P2}/f_0 \leq 7.0$ and more preferably the relationship $f_{U2/P2}/f_0 \leq 5.0$);

and $Q_{U2/P2} \geq 35.0$ (preferably $\geq 45.0$, more preferably $\geq 100.0$).

In connection with these embodiments, the plurality of lens elements of the second lens unit can also comprise a lens element $L_{U2/P3}$ which:
   (i) comprises a glass material having a Q-value $Q_{U2/P3}$, and
   (ii) has a focal length $f_{U2/P3}$, where $f_{U2/P3}$ and $Q_{U2/P3}$ satisfy the relationships:

$f_{U2/P3} > 0$ ($f_{U2/P3}$ preferably satisfies the relationship $f_{U2/P3}/f_0 \leq 10.0$ and more preferably the relationship $f_{U2/P3}/f_0 \leq 7.0$);

and $Q_{U2/P3} \geq 35.0$ (preferably $\geq 45.0$, more preferably $\geq 100.0$).

In its preferred embodiments, the projection can include a reflective surface (RS) for folding the projection lens' optical axis, said reflective surface being between the first lens unit and the second lens unit. The reflective surface can, for example, be a mirror or prism which produces a fold in the optical axis in the range of, for example, 60–70°, e.g., approximately 64°).

In addition to providing a large space between the short conjugate end of the first lens unit and the long conjugate end of the second lens unit, the projection lenses of the invention also preferably include an aperture stop (AS) between the reflective surface and the second lens unit and provide a large space between the short conjugate end of first lens unit (i.e., the $S_1$ surface) and the aperture stop. In particular, the spacing $S_{1-AS}$ between the center of optical surface $S_1$ and the center of the aperture stop preferably satisfies the relationship:

$S_{1-AS}/f_0 \geq 3.0$ (more preferably $\geq 5.0$).

It should be noted that the projection lens can have a physical aperture stop or can use the output of the illumination system as a virtual aperture stop (see, for example, Betensky, U.S. Pat. No. 5,313,330). In either case, the aperture stop is preferably on the short conjugate side of the reflective surface. Alternatively, but less preferred, the aperture stop can be located at the reflective surface, e.g., an aperture stop can be applied to or painted onto the reflective surface. Note that for the projection lens to operate efficiently, the aperture stop should either completely clear the reflective surface or should be completely on the reflective surface, i.e., the reflective surface should not intersect and thus cut off a part of the aperture stop.

Although an aperture stop on the long conjugate side of the reflective surface can be used in the practice of the invention, such a location for the aperture stop is generally not preferred since the second lens unit then must have a long focal length to produce a telecentric entrance pupil for the overall lens.

In terms of vignetting, the projection lens preferably exhibits no more than 35% (more preferably, no more than 30%) vignetting at its working f-number, where the working f-number is preferably less than or equal to 2.4 (e.g., approximately 2.0).

In terms of lateral color, the projection lens preferably has a lateral color LC in its short conjugate focal plane which satisfies the relationships:

$LC_{red-blue} \leq 0.0003*f_0$ (more preferably $\leq 0.0002*f_0$; most preferably $\leq 0.0001*f_0$), $LC_{red-green} \leq 0.0009*f_0$ (more preferably $\leq 0.0005*f_0$, most preferably $\leq 0.0003*f_0$), and $LC_{blue-green} \leq 0.0006*f_0$ (more preferably $\leq 0.0004*f_0$, most preferably $\leq 0.0002*f_0$), where (i) the red-blue and red-green relationships are satisfied over the full field in the short conjugate focal plane, (ii) the blue-green relationship is satisfied over at least 95% of the full field in the short conjugate focal plane, and (iii) the red, green, and blue wavelengths are 0.64 micrometers, 0.55 micrometers, and 0.44 micrometers, respectively.

In terms of distortion, the projection lens preferably has a percentage distortion D which:

(i) over the full field has a magnitude that is less than 1.0 (i.e., at all points of the field the magnitude of the distortion is less than 1.0%); and (ii) over the half field-to-full field range has a maximum value $D_{max}$ and a minimum value $D_{min}$ which satisfy the relationship:

$|D_{max} - D_{min}| \leq 0.4$.

The second of these criteria for a high level of distortion correction is directed to the phenomenon known as "apparent distortion." When looking at an image on a screen, users are particularly sensitive to curvature along the top or bottom of the image. Such curvature will arise if the distortion varies between, for example, the middle of the top of the screen to the edges of the top of the screen. For a typical 16:9 format, the middle of the top of the screen corresponds to the half field of view and the edges of the top of the screen correspond to the full field of view. By keeping the variation in percentage distortion over this range below 0.4, the problem of apparent distortion is avoided.

In accordance with a second aspect, the invention provides a projection lens system which comprises a projection lens in accordance with the first aspect of the invention and a pixelized panel (PP) which, preferably, is a DMD panel.

The reference symbols used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention, and are intended to provide an overview or framework for understanding the nature and character of the invention.

Additional features and advantages of the invention are set forth below, and in part will be readily apparent to those skilled in the art from that description or recognized by practicing the invention as described herein. The accompanying drawings are included to provide a further understanding of the invention, and are incorporated in and constitute a part of this specification.

DESCRIPTION OF THE PREFERRED EMBODIMENTS

Figure 1A:
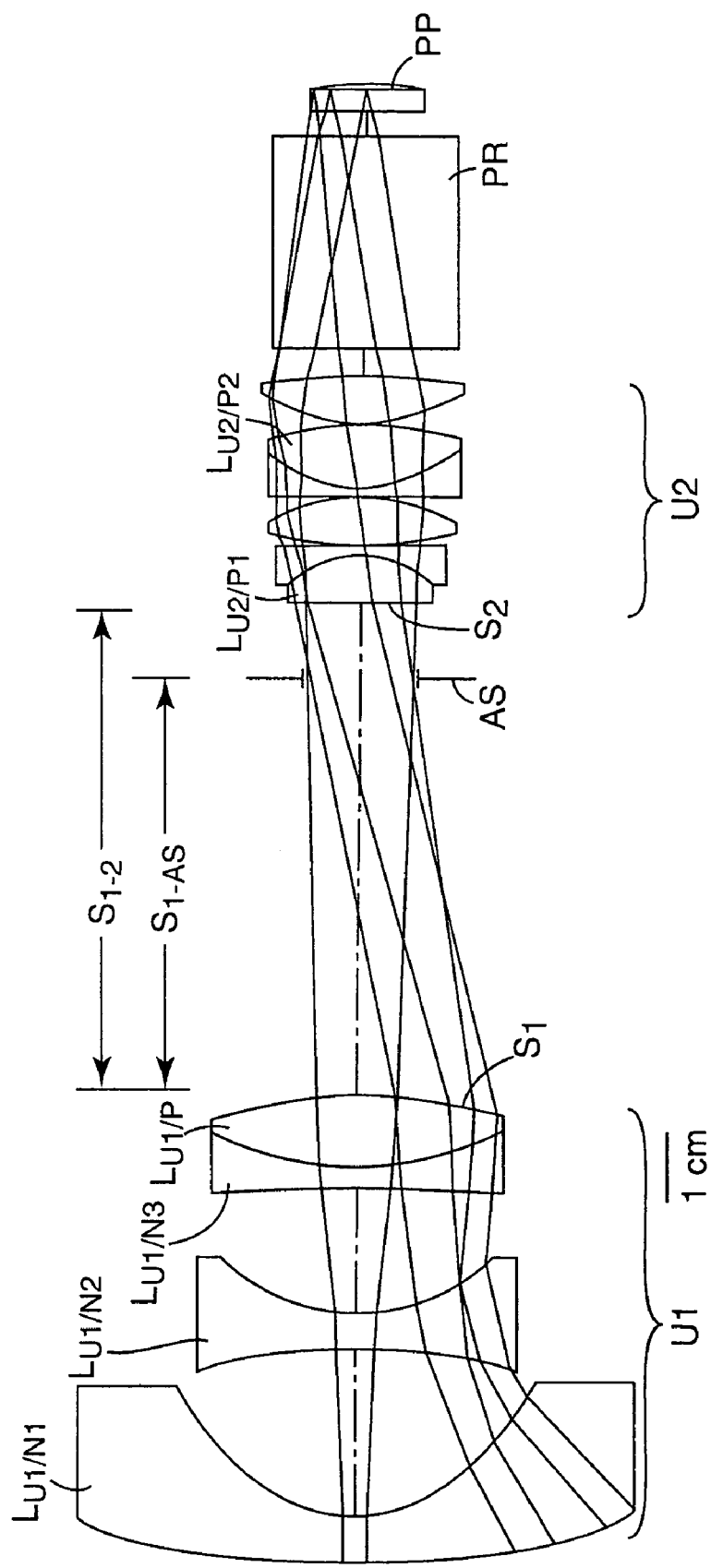
FIGS. 1A, 2A, 3A, 4A and 5 are schematic side views of representative projection lenses constructed in accordance with the invention in an unfolded configuration.
Figure 1B:
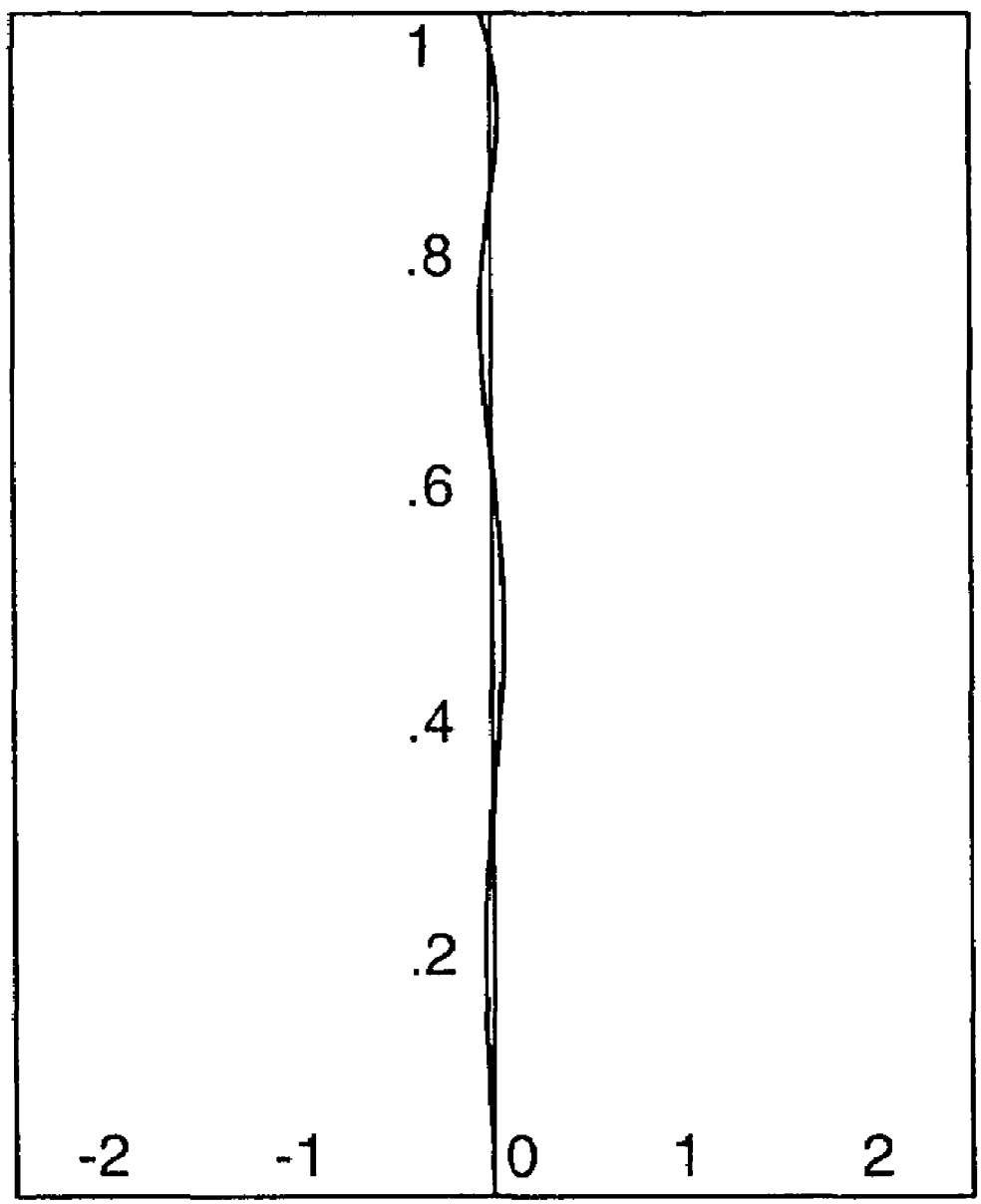
FIGS. 1B, 2B, and 3B are plots showing radial distortion for the projection lenses of FIGS. 1A, 2A, and 3A, respectively. The vertical axis in each figure shows normalized field height and the horizontal axis shows percentage distortion.

The projection lenses of the present invention are of the retrofocus or the inverted telephoto type and consist of two lens units, i.e., a first unit (U1) on the long conjugate side and a second unit (U2) on the short conjugate side, which are separated by a physical or virtual aperture stop. The first lens unit has strong negative power on its long conjugate side.

Its overall power can be negative or weakly positive. When positive, the focal length of the first lens unit ($f_{U1}$) can satisfy the relationship $f_{U1}/f_0 \geq 5$, preferably the relationship $f_{U1}/f_0 \geq 10$, and most preferably the relationship $f_{U1}/f_0 \geq 15$. The second lens unit has a positive focal length. Its focal length ($f_{U2}$) can satisfy the relationship $f_{U2}/f_0 \leq 10.0$, preferably the relationship $f_{U2}/f_0 \leq 7.0$, and most preferably the relationship $f_{U1}/f_0 \leq 5.0$.

The use of a lens form of the retrofocus type to produce an image of a pixelized panel has various advantages. Thus, telecentricity can be achieved by locating the lens' aperture stop in the front focal plane of the second positive unit. Additional advantages, illustrated by the examples presented below, are the ability to achieve a relatively long effective back focal length and the ability to provide a wide field of view in the direction of the lens' long conjugate. As discussed above, both of these characteristics are particularly useful in rear projection systems, where the lens must have a wide field of view to achieve the smallest possible overall package size, and where there is a need to accommodate beam splitting prisms and/or beam guiding prisms between the lens and the pixelized panel. These prisms may include TIR prisms, polarizing beam splitters, and/or color splitting prisms.

The lenses of the invention achieve a high level of distortion correction by using two or more aspherical surfaces in the first lens unit. Specifically, the $L_{U1/N1}$ and $L_{U1/N2}$ lens elements each has one aspherical surface and preferably at least one of the two elements has two aspherical surfaces. Most preferably, both lens elements have two aspherical surfaces.

In the examples presented below, the second lens unit uses only glass elements, none of which have an aspherical surface, and such a construction for the second lens unit is preferred. However, if desired, some residual distortion, as well as spherical aberration of the lens' entrance pupil, can be corrected through the use of one or more aspherical surfaces in the second lens unit. The spherical aberration of the entrance pupil should be minimized to achieve telecentricity for any arbitrary point in the object plane of the lens. Preferably, the aspherical surfaces of the first lens unit and the second lens unit, if used, are formed on plastic lens elements.

The most critical aberration that must be corrected is the lens' lateral color. The lenses of the invention preferably achieve such correction using anomalous dispersion glasses (also known as "abnormal partial dispersion" glasses) as discussed in U.S. Pat. No. 5,625,495 and/or by using the techniques of U.S. Pat. No. 6,195,209 (see above).

In accordance with the invention, it has been found that lateral color correction, including secondary lateral color correction, can be achieved by: (1) employing at least two negative lens elements in the first lens unit which are composed of plastic materials having high +Q values, i.e., $L_{U1/N1}$ and $L_{U1/N2}$, and (2) employing at least one positive lens element (and, preferably, at least two positive lens elements) in the second lens unit composed of a glass having an abnormal partial dispersion, i.e., $L_{U2/P1}$ and, preferably, $L_{U2/P1}$ and $L_{U2/P2}$. In this way, the use of expensive anomalous dispersion glasses in the first lens unit, where elements are large, can be avoided, which significantly reduces the cost of the lens.

The preferred plastic material for use in the $L_{U1/N1}$ and $L_{U1/N2}$ lens elements of the first lens unit is acrylic, although other low dispersion, high +Q plastics, e.g., COC, can be used for one or both of these elements if desired. A variety of anomalous dispersion glasses can be used in the second lens unit, examples of which include OHARA S-FPL51, OHARA S-FPL52, and OHARA S-PHM52 glasses. Other anomalous dispersion glasses can, of course, be used in the practice of the invention if desired.

As illustrated by the examples presented below, in some cases, the second lens unit can include a third positive lens element composed of anomalous dispersion glasses, i.e., $L_{U2/P3}$. Additional positive lens elements having an anomalous dispersion can be used in the second unit if desired, but are generally not needed and are not preferred because they increase the cost of the lens. As illustrated in Example 4, the second lens unit can also include an element in the vicinity of the aperture stop, e.g., the spacing S between such an element and the stop can satisfy the relationship $S/f_0 \leq 1.0$.

In addition to the $L_{U1/N1}$ and $L_{U1/N2}$ lens elements, the first lens unit also includes a positive lens element, i.e., $L_{U1/P}$, and preferably includes a third negative lens element, i.e., $L_{U1/N3}$. $L_{U1/P}$ is composed of a glass material, as is $L_{U1/N3}$, when used. Preferably, when $L_{U1/N3}$ is used, $L_{U1/P}$ and $L_{U1/N3}$ are in the form of a cemented doublet. The dispersion properties of these glass elements are chosen primarily to help in the correction of axial color without unduly compromising the correction of lateral color and, in particular, the correction of secondary lateral color, achieved through the use of $L_{U1/N1}$, $L_{U1/N2}$, and $L_{U2/P1}$, plus $L_{U2/P2}$ or $L_{U2/P2}$ and $L_{U2/P3}$, when used. To minimize costs, inexpensive glasses are preferred for the $L_{U1/P}$ and $L_{U1/N3}$ elements.

As discussed above, the use of reflective pixelized panels can exacerbate the problem of ghost formation since such panels are designed to reflect light. This problem can be addressed during the lens design process by ensuring that the axial marginal ray traced through the projection lens from the projection lens' short conjugate focal plane intersects each lens surface of the projection lens at an angle of incidence θi that is greater than or equal to 1.5 degrees.

For example, a constraint of this type can be incorporated in the lens design computer program at the beginning of the design process. Alternatively, as a lens design is being developed, the shape of offending surfaces can be changed to meet this criterion. Because the height of the axial marginal ray tends to be small at the long conjugate end of the lens, the angle of incidence of that ray with the lens surfaces of the $L_{U1/N1}$ lens element and any lens surfaces which may be on the long conjugate side of $L_{U1/N1}$ need not be greater than or equal to 1.5 degrees, i.e., θi may be less than, equal to, or greater than 1.5 degrees for these surfaces.

Typically, the $L_{U1/N1}$ lens element constitutes the long conjugate end of the projection lens so that only the $L_{U1/N1}$ lens element is excluded from the θi≧1.5 degrees criterion.

In addition to controlling the angle of incidence θi, the ghost problem can also be addressed by minimizing the number of lens elements and thus the number of reflection surfaces included in the projection lens. Using smaller numbers of lens elements also reduce the cost, weight, and complexity of the projection lens.

Without intending to limit it in any manner, the present invention will be more fully described by the following examples.

EXAMPLES

FIGS. 1–5 and Tables 1–5 illustrate representative projection lenses constructed in accordance with the invention.

OHARA designations are used for the various glasses employed in the lens systems. Equivalent glasses made by other manufacturers (e.g., HOYA or SCHOTT) can be used in the practice of the invention. Industry acceptable materials are used for the plastic elements.

The aspheric coefficients set forth in the tables are for use in the following equation:

$$z = \frac{cy^2}{1 + [1 - (1+k)c^2y^2]^{1/2}} + Dy^4 + Ey^6 + Fy^8 + Gy^{10} + Hy^{12} + Iy^{14}$$

where z is the surface sag at a distance y from the optical axis of the system, c is the curvature of the lens at the optical axis, and k is a conic constant, which is zero except where indicated in the prescriptions of Tables 1–5.

The designation "a" associated with various surfaces in the tables represents an aspherical surface, i.e., a surface for which at least one of D, E, F, G, H, or I in the above equation is not zero; and the designation "c" indicates a surface for which k in the above equation is not zero. The various planar structures located on the short conjugate side of U2 in the figures and tables represent components (e.g., prism PR) which are used with or are a part of the pixelized panel. They do not constitute part of the projection lens. Surfaces 8 and 10 in Tables 1–3, surface 8 in Table 4, and surfaces 7 and 9 in Table 5 are vignetting surfaces which are included in the design process to take account of the folding of the optical axis by the reflective surface. All dimensions given in Tables 1–5 and in summary Tables 7–10 are in millimeters, except where indicated. Table 6 sets forth the N, V, and Q values for the optical materials used in Tables 1–5.

The prescription tables are constructed on the assumption that light travels from left to right in the figures. In actual practice, the viewing screen will be on the left and the pixelized panel will be on the right, and light will travel from right to left. In particular, the references in the prescription tables to objects/images and entrance/exit pupils are reversed from that used in the rest of the specification. The pixelized panel is shown in the FIGS. 1A, 2A, 3A, 4A, 4B, and 5 by the designation "PP" and the aperture stop is shown by the designation "AS".

As can been seen from Tables 1–5, each of Examples 1–5 has an entrance pupil (exit pupil in Tables 1–5) which is telecentric.

The focal lengths of the lens units making up the projection lenses of Tables 1–5 are set forth in Table 7 where $f_{U1}$ is the focal length of U1 and $f_{U2}$ is the focal length of U2. Also set forth in this table are the BFL, $S_{1-2}$, and $S_{1-AS}$, values for these examples, as well as their ratios to $f_0$.

Tables 8 and 9 set forth the lateral color and distortion performance of the examples, where the lateral color performance is given in microns and the distortion performance in percent. The field of view in the direction of the long conjugate and the vignetting value for each example is also included in Table 9. Table 10 sets forth the values exhibited by Examples 1–5 for various of the parameters referred to above.

Performance characteristics of the projection lenses of Tables 1–3 are shown in FIGS. 1B–D, 2B–D, and 3B–D, respectively. Examples 4 and 5 have similar performance characteristics.

More particularly, FIGS. 1B–D, 2B–D, and 3B–D contain the following:

(1) A plot of radial distortion (FIGS. 1B, 2B, and 3B), which shows percent distortion versus relative field height.

Figure 1C:
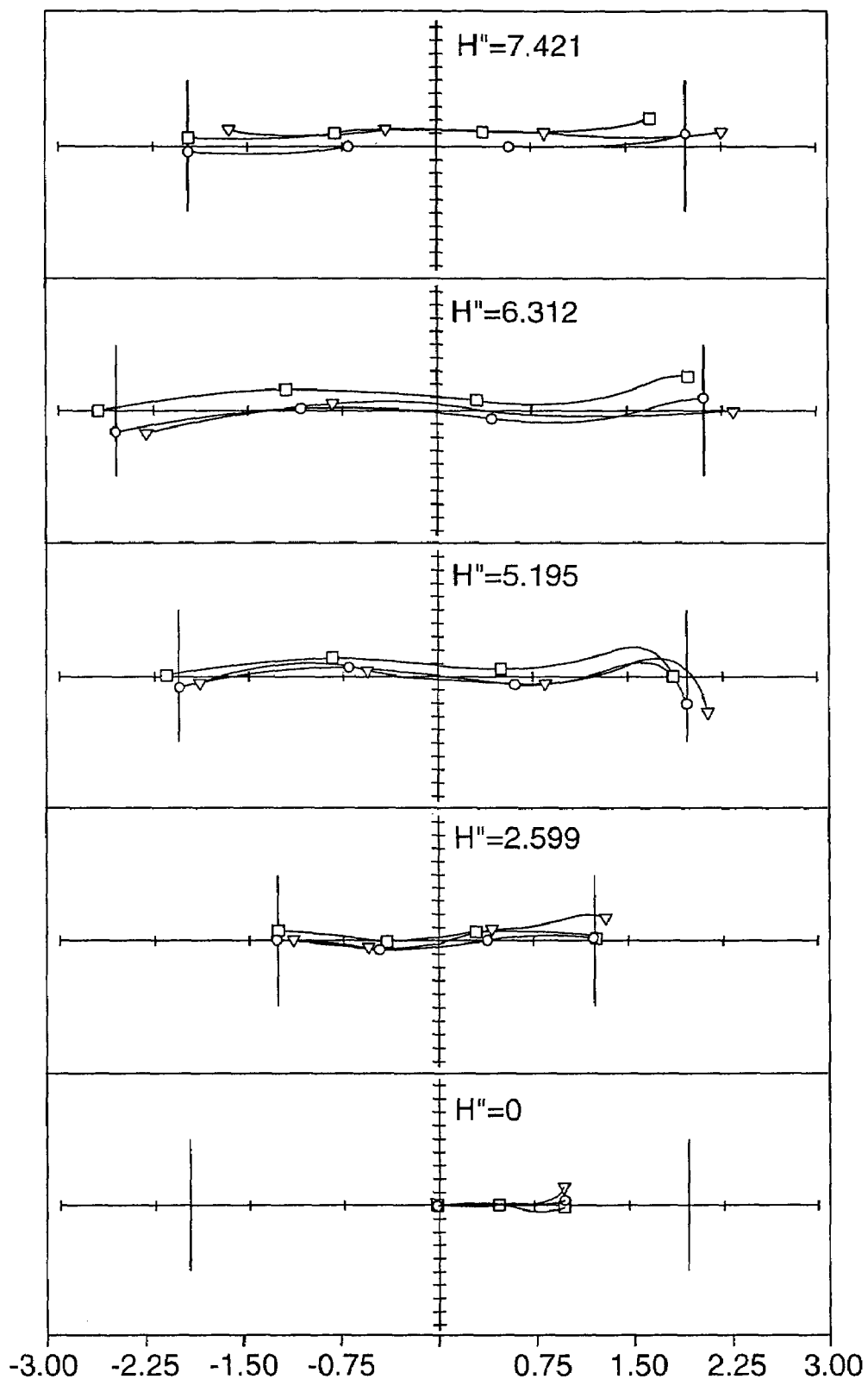
FIGS. 1C, 2C, and 3C are plots showing lateral aberrations, specifically, TAN, SAG, and SAG-Y data, versus relative entrance pupil coordinates for the projection lenses of FIGS. 1A, 2A, and 3A, respectively. The wavelengths represented by circles, triangles, and squares in these figures are 546 nanometers, 440 nanometers, and 640 nanometers, respectively.
Figure 1D:
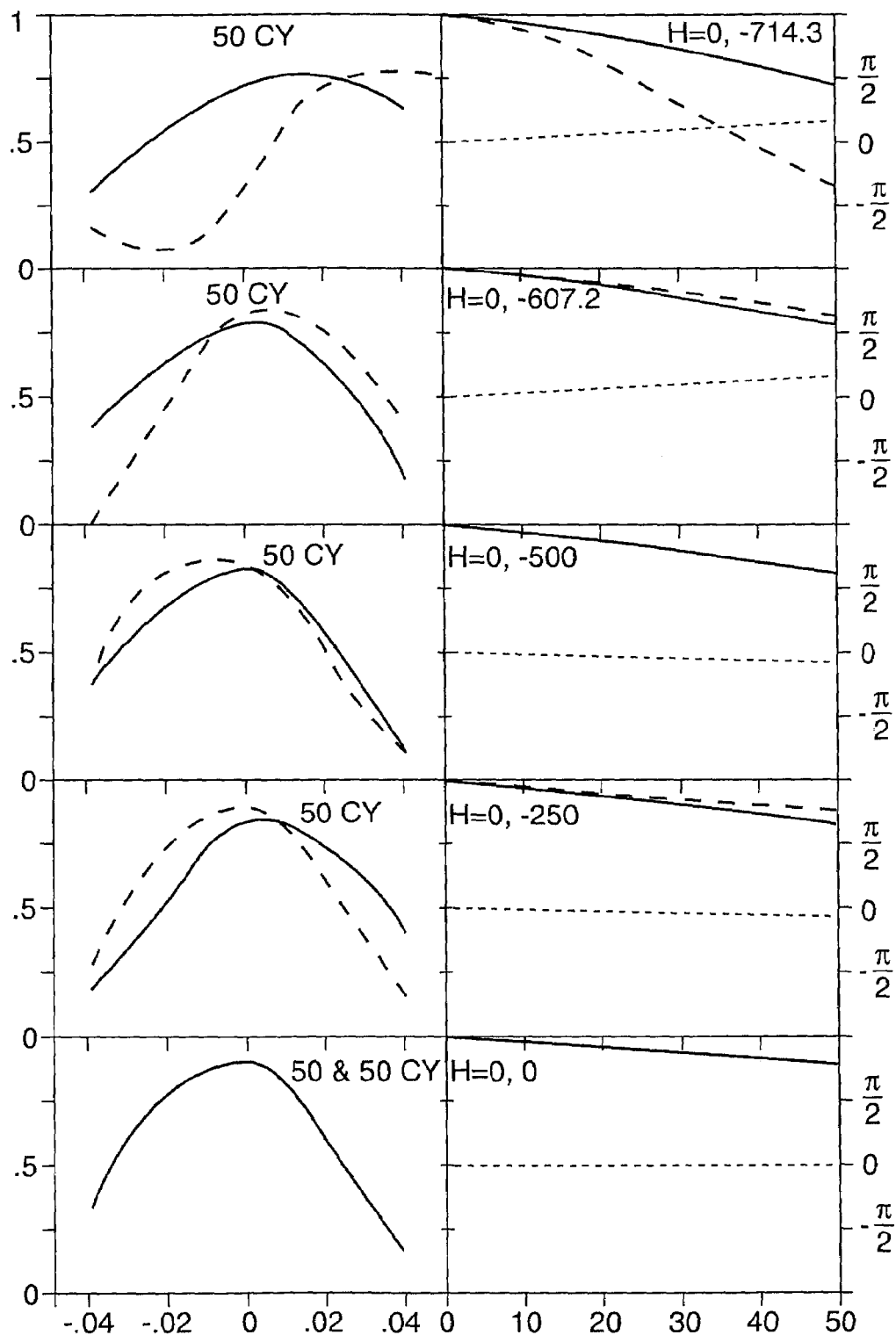
FIGS. 1D, 2D, and 3D are plots showing monochromatic optical transfer functions for the projection lenses of FIGS. 1A, 2A, and 3A, respectively. In each figure, the left panel shows through focus data and the right panel shows at focus versus frequency data for a wavelength of 546 nanometers, with dotted lines representing PHASE data, dashed lines representing SAG data, and solid lines representing TAN data. The at focus positions are 0 for FIGS. 1D and 3D, and −0.01 millimeters for FIG. 2D.
Figure 2A:
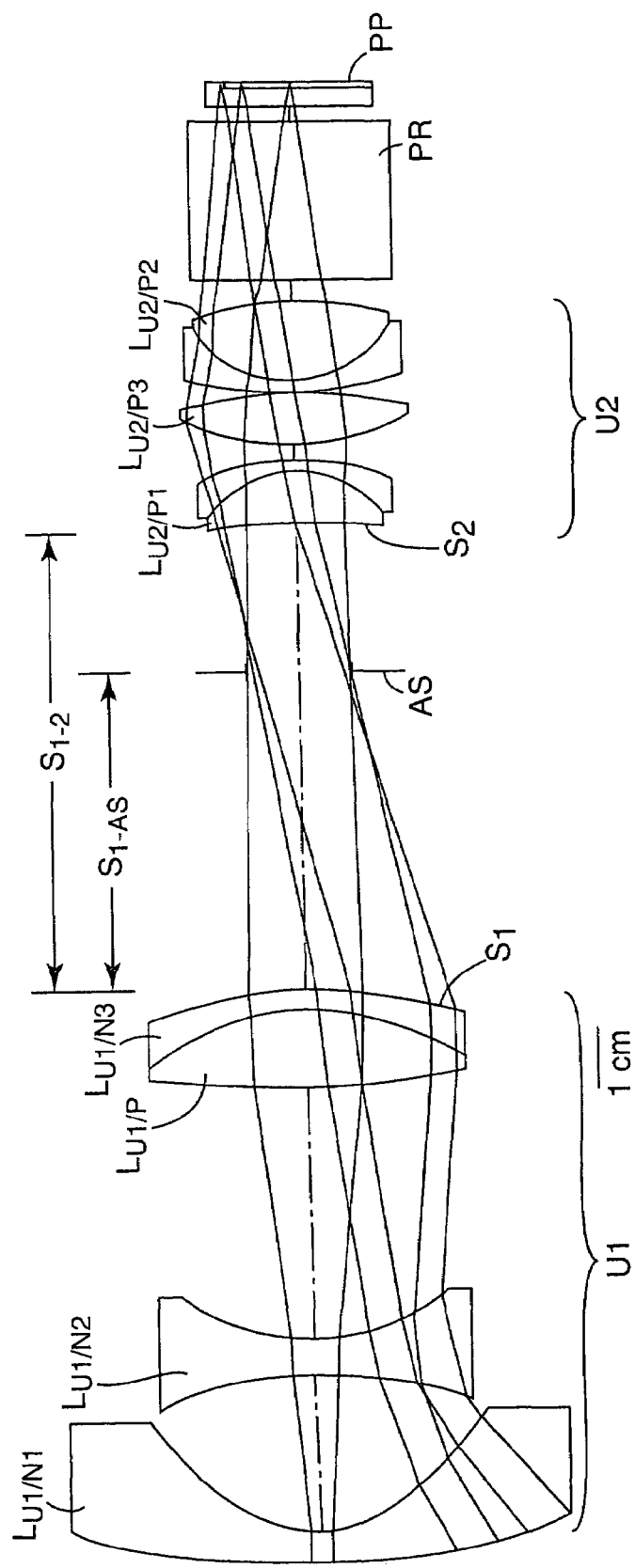
Figure 2B:
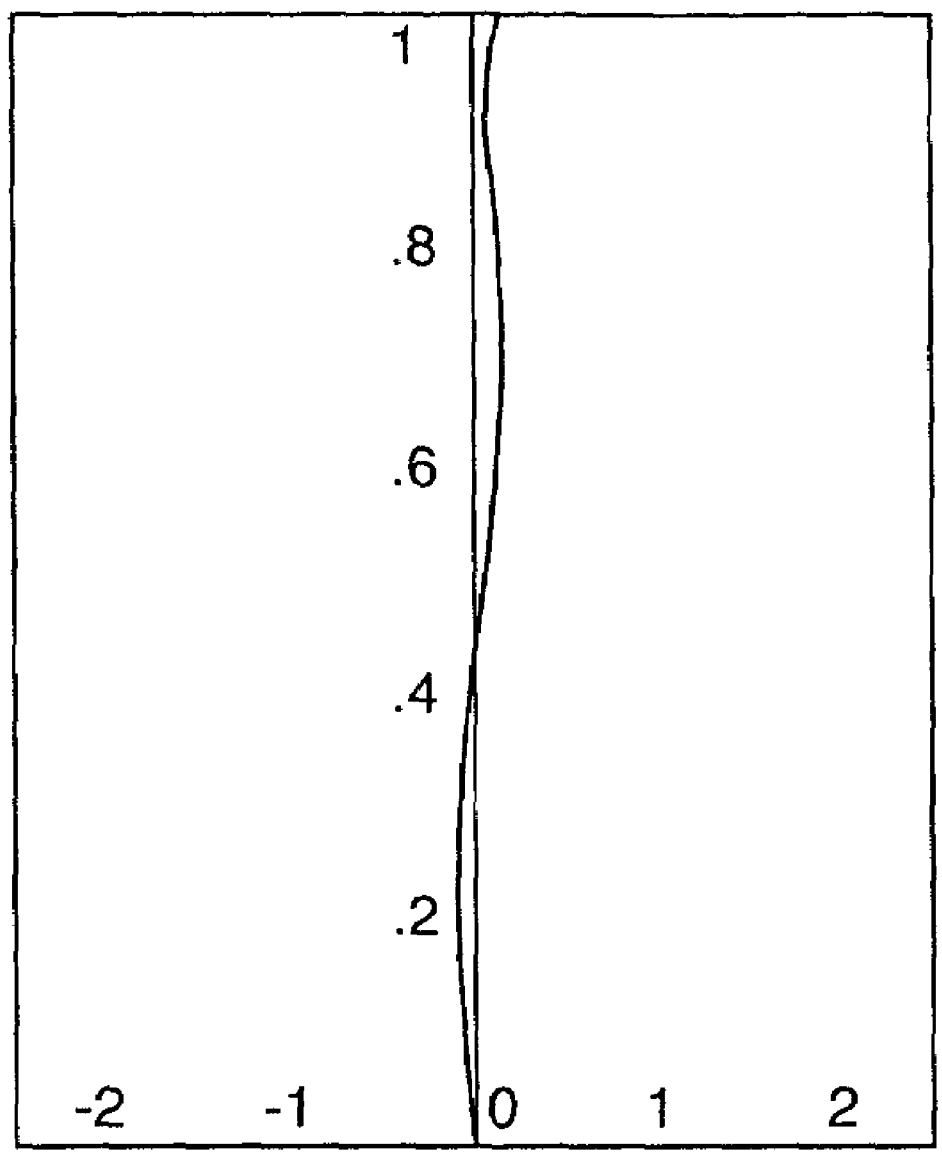
Figure 2C:
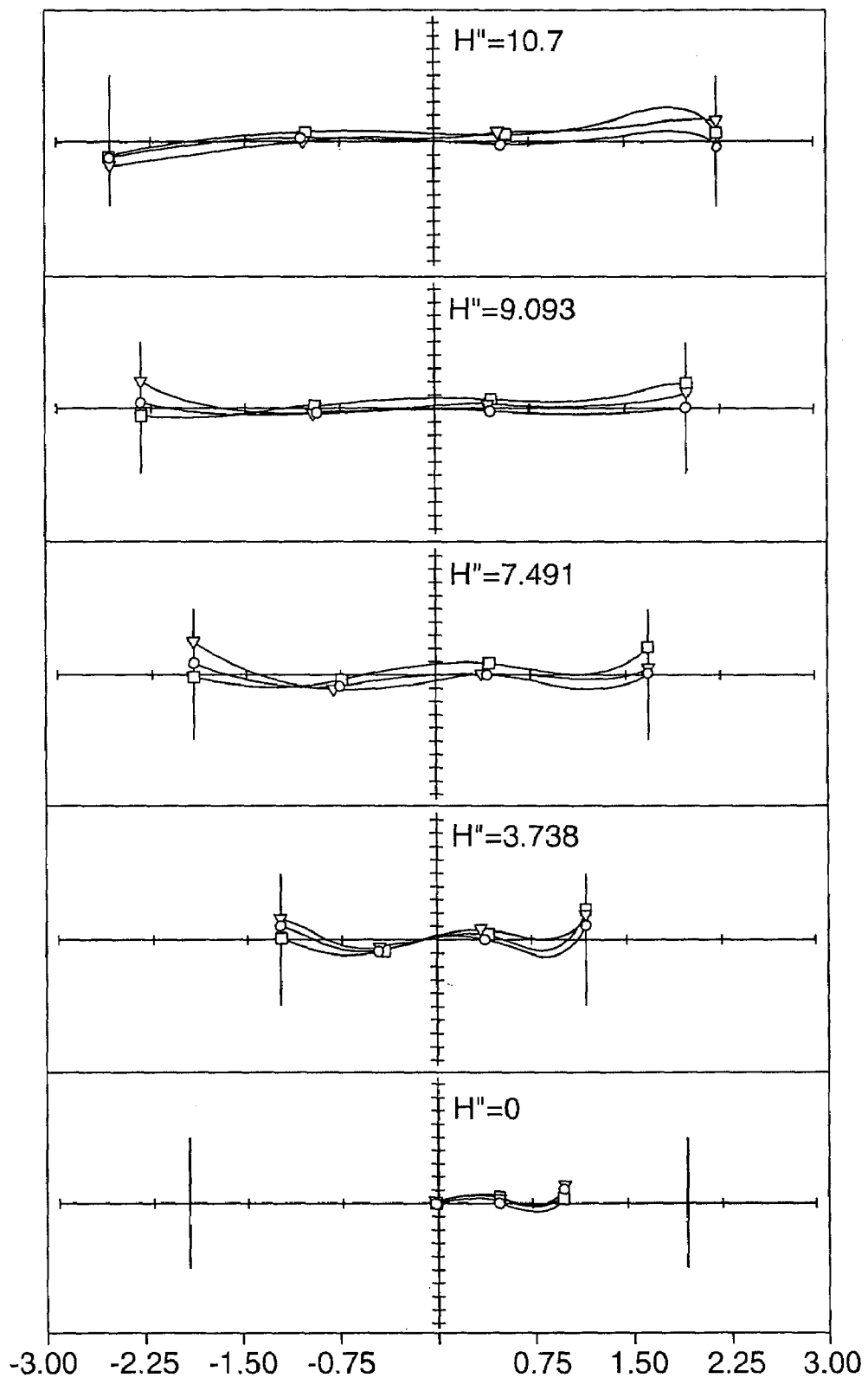
Figure 2D:
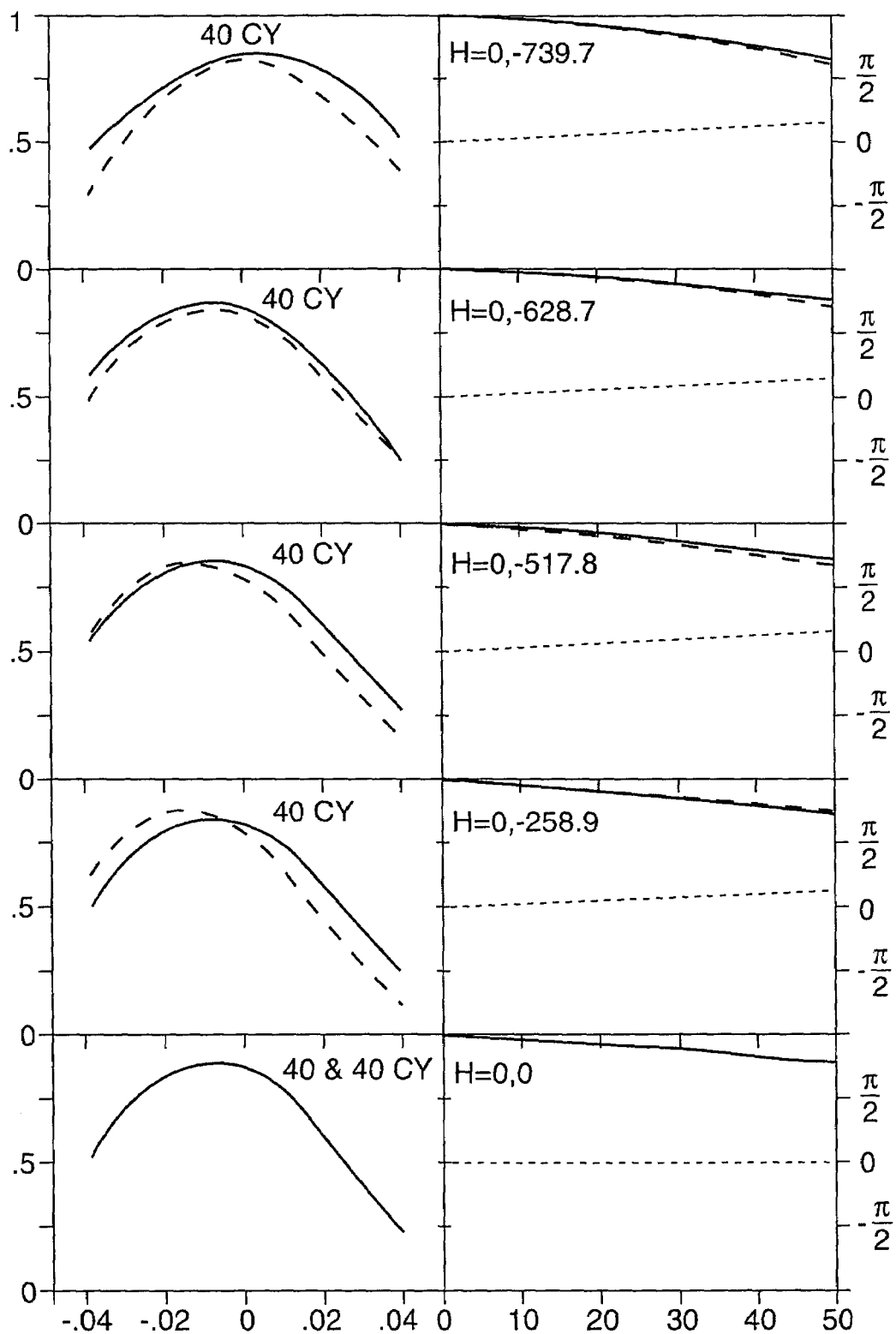
Figure 3A:
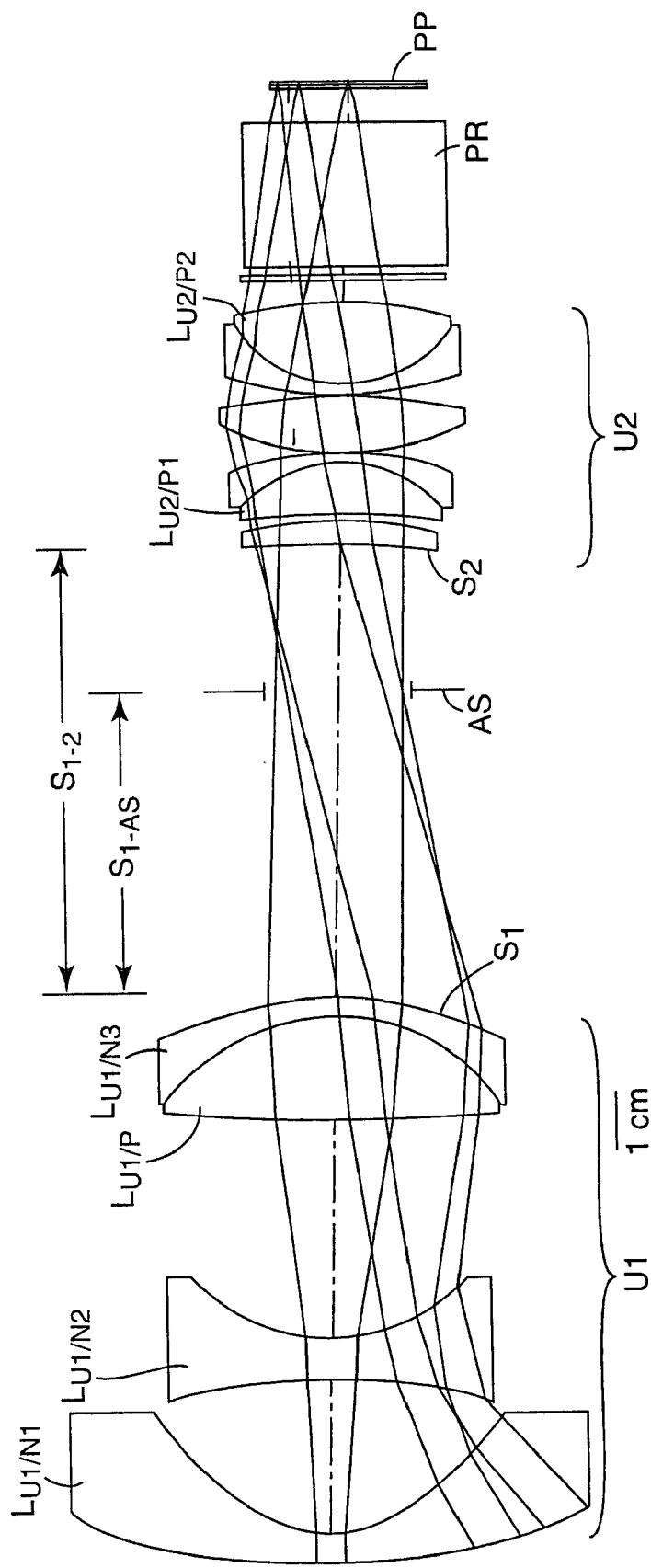
Figure 3B:
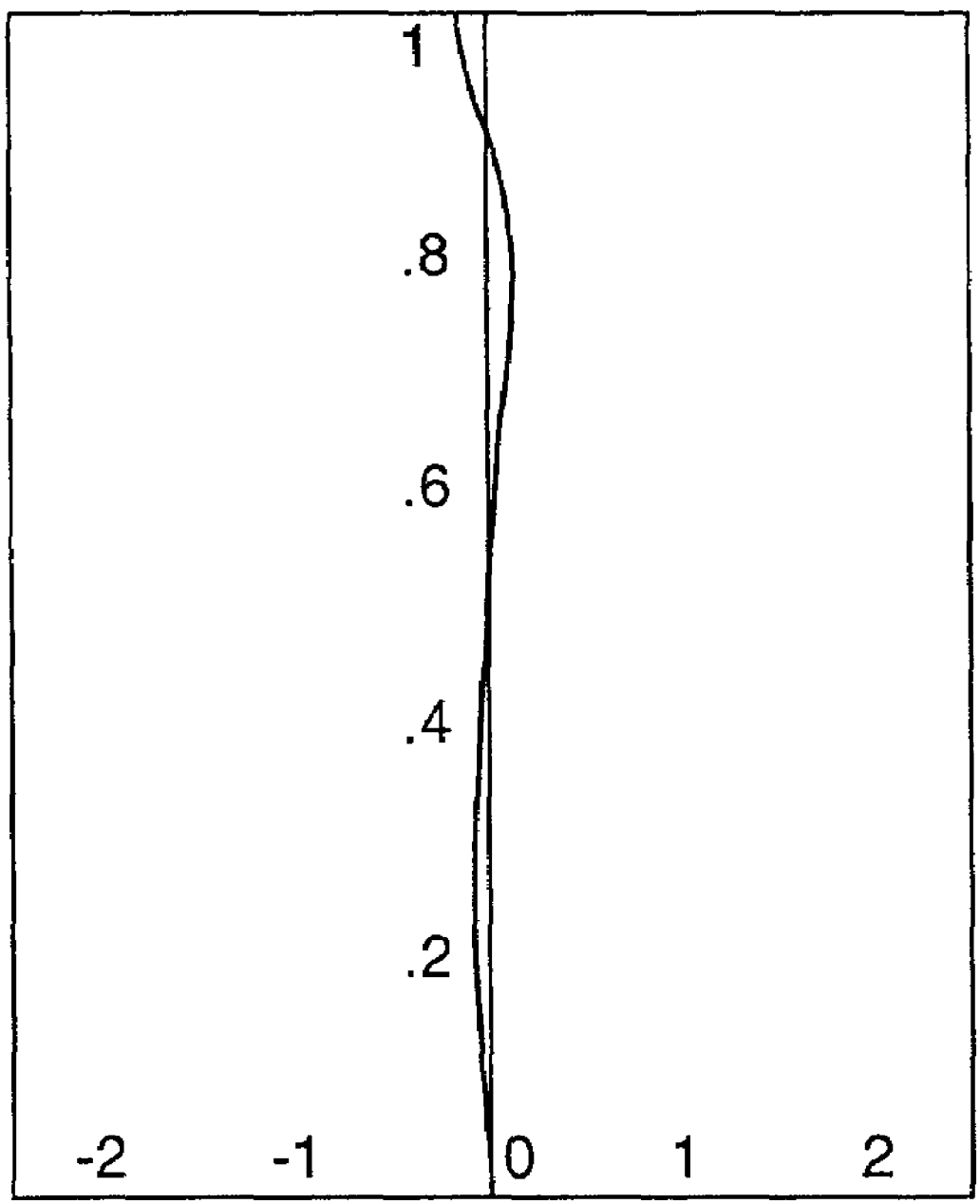
Figure 3C:
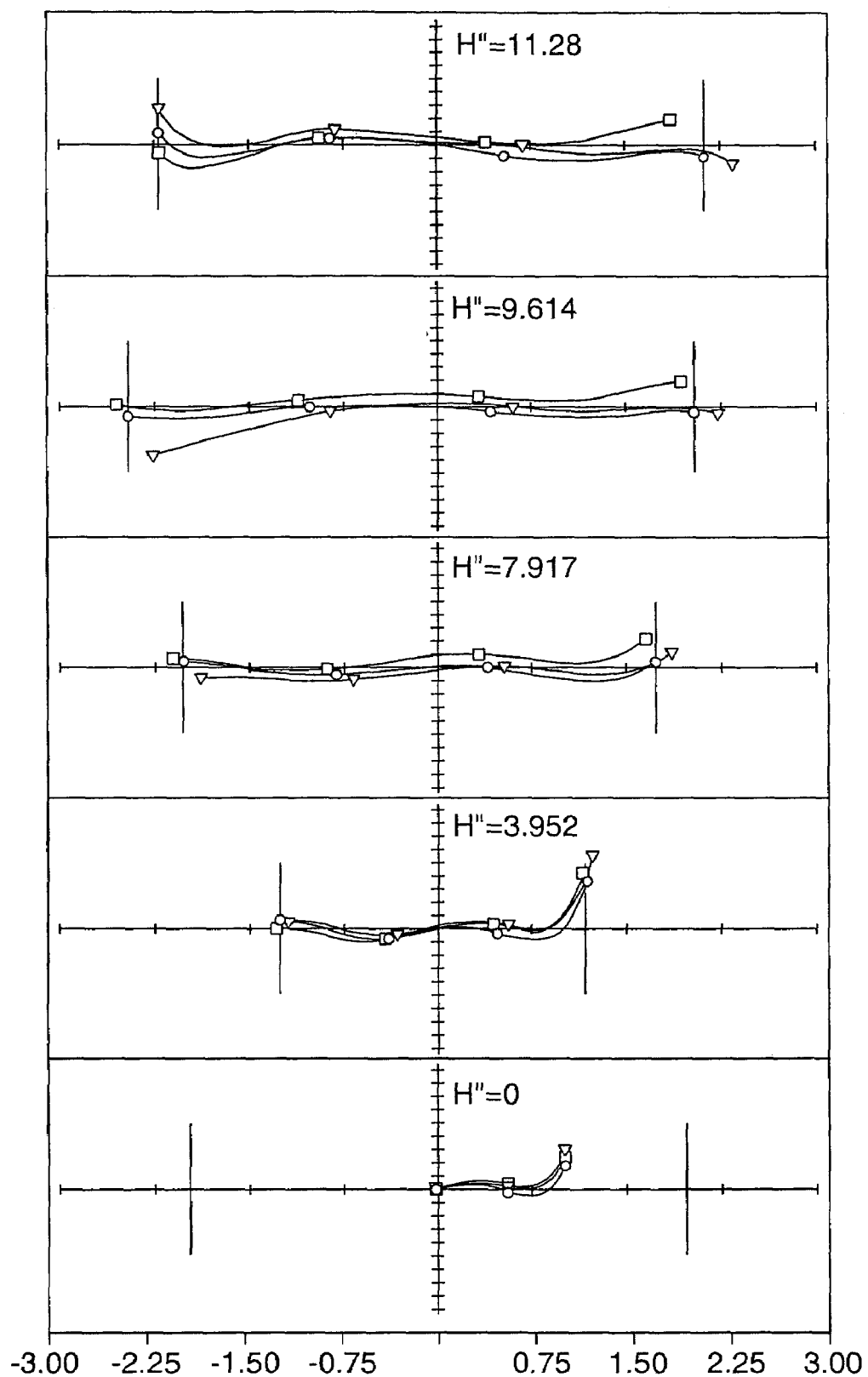
Figure 3D:
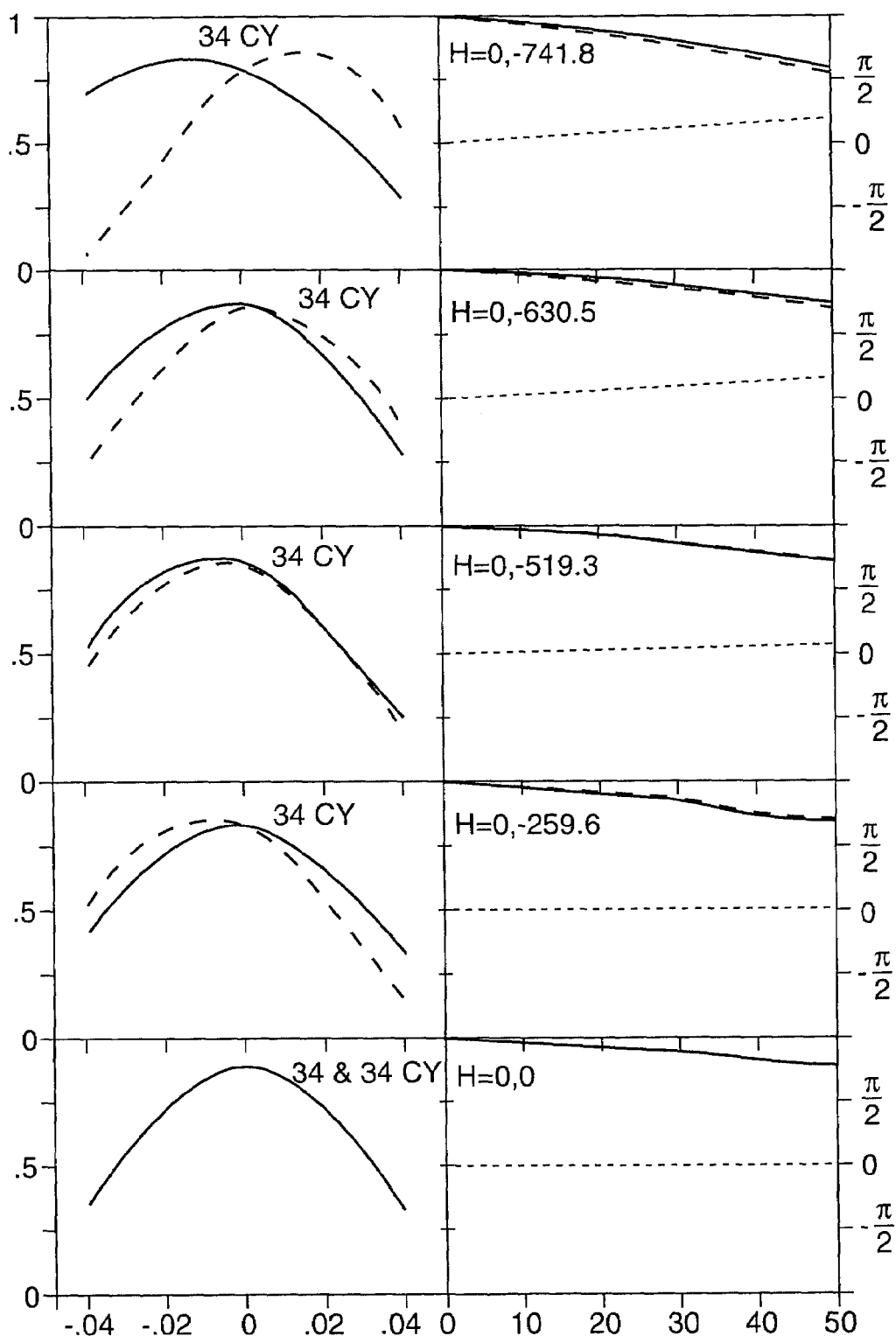
Figure 4A:
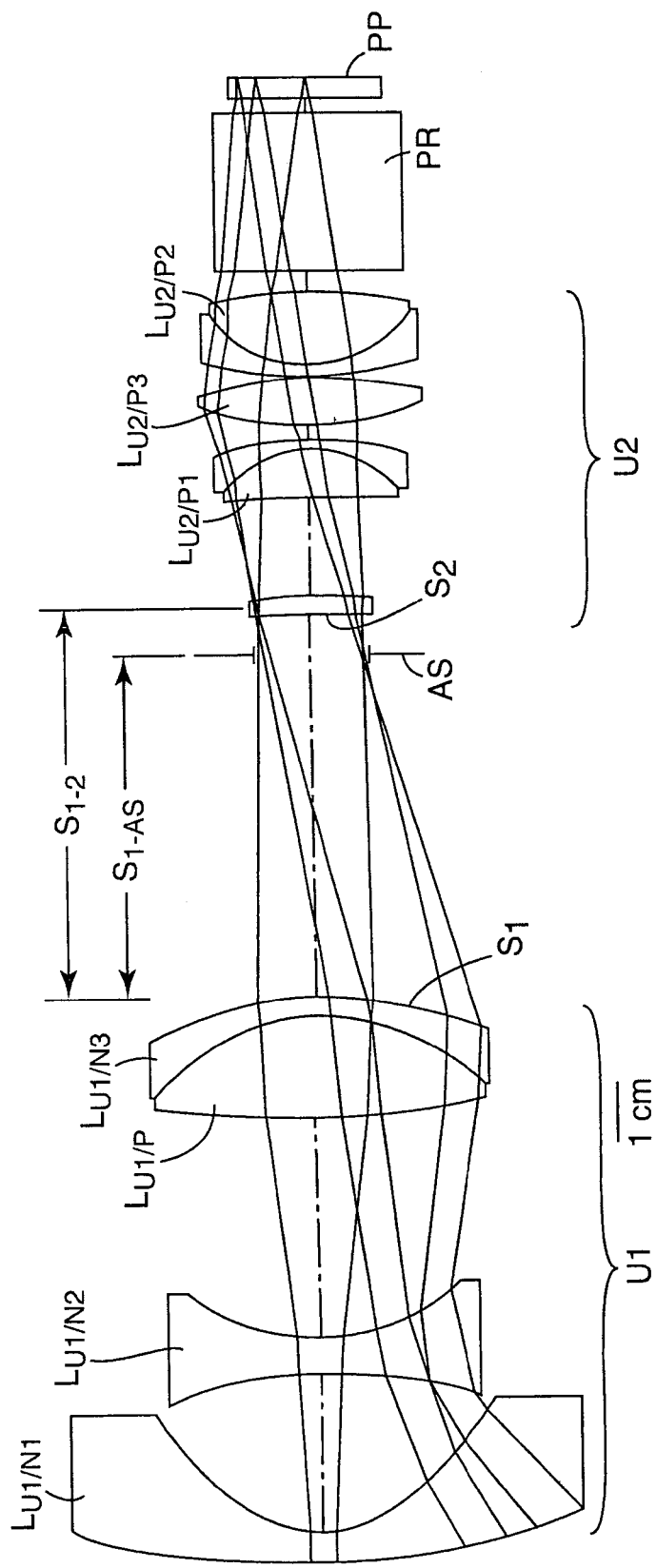
Figure 4B:
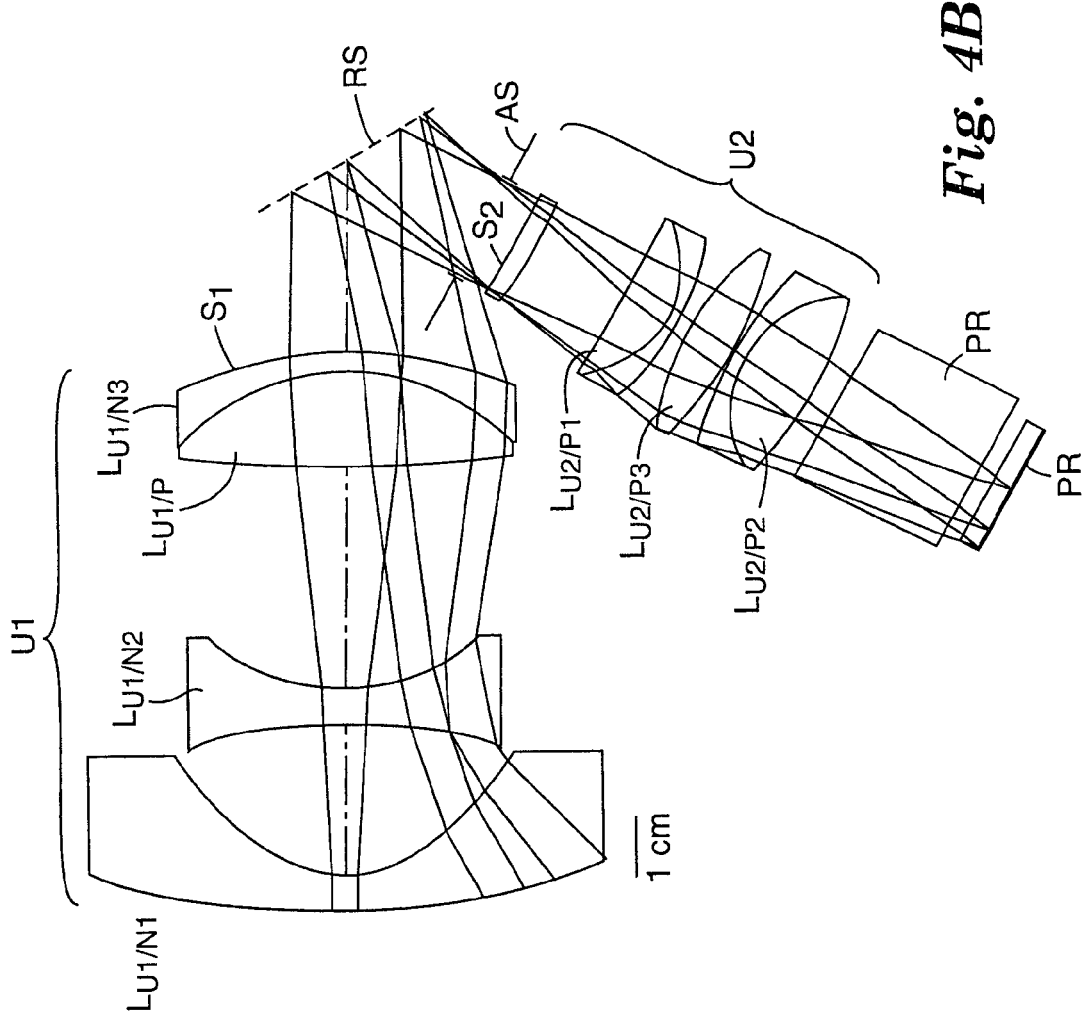
FIG. 4B is a schematic side view of the projection lens of FIG. 4A in its folded configuration. During a typical application of the invention, the projection lenses of FIGS. 1A, 2A, 3A, and 5 will be similarly folded.
Figure 5:
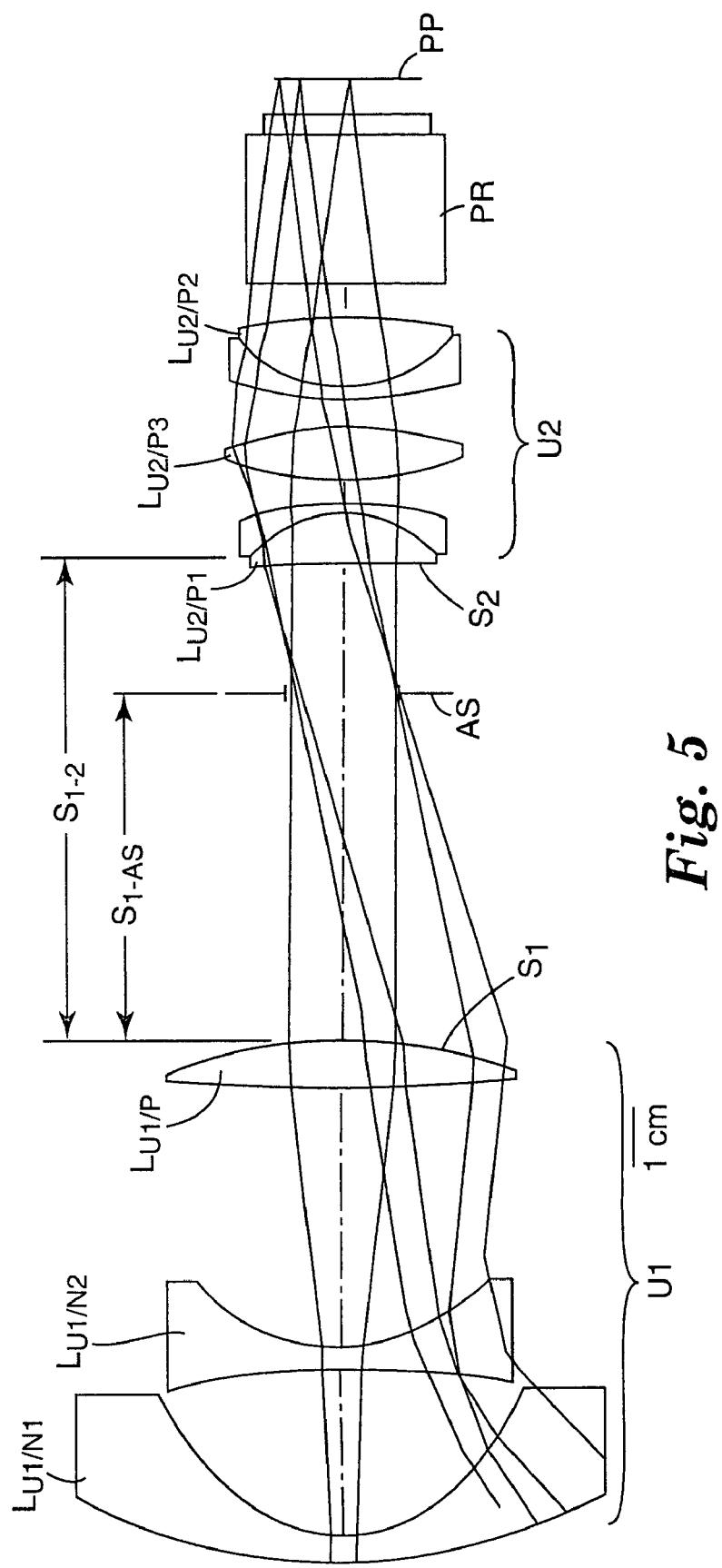
Figure 6:
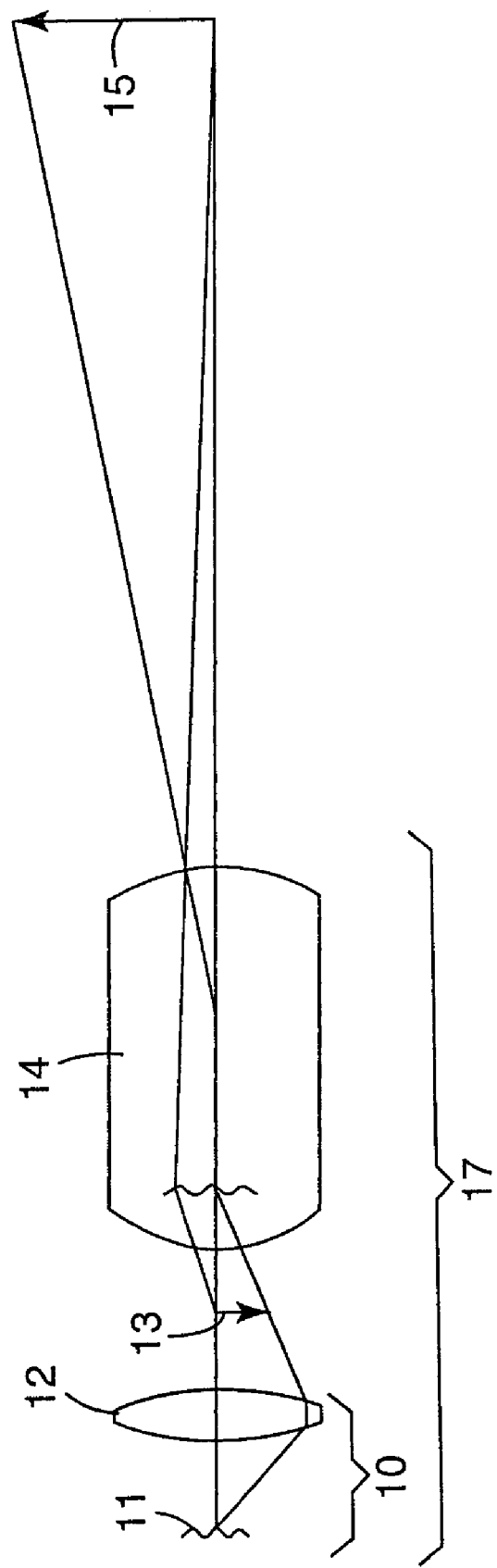
FIG. 6 is a schematic diagram showing an overall projection lens system in which the projection lenses of the present invention can be used. As with FIGS. 1A, 2A, 3A, 4A and 5, for ease of illustration, this figure does not show the projection lens in its folded configuration. Similarly, the details of the telecentricity of the projection lens are not shown in FIG. 6.

(2) A series of plots which show lateral aberrations versus relative entrance pupil coordinates (FIGS. 1C, 2C, and 3C). These plots illustrate the high level of color correction, specifically, lateral color correction, achieved by the projection lenses of the invention for various field points at the pixelized panel. The field point heights (H" values) are in millimeters, and the vertical scales are in 0.005 millimeters (5 microns).

(3) Optical transfer function (OTF) plots (FIGS. 1D, 2D, and 3D) which show the through-focus modulation transfer function (MTF) on the left and the OTF at best axial focus on the right for various field points at the viewing screen. The field coordinates shown in the right hand plots apply to both the right hand and left hand plots and are in millimeters. The through-focus data are at the indicated spatial frequency in cycles per millimeter. Both the through-focus and best-focus data indicate tangential and sagittal (dashed curves) MTF. The modulus scale is on the left of each block and runs from zero to one. The phase of the OTF is shown as a dotted curve in the best-focus plots. The scale for the phase is indicated on the right of each best-focus block and is in radian measure. All the OTF data are for a wavelength of 546 nanometers. The best-focus plane is at the peak of the axial through-focus plot.

As shown by these figures, the projection lenses of the invention can achieve a distortion which is less than about 0.5% and a lateral color correction which is better than about six microns over the 440 to 640 nanometer range.

As illustrated by the above examples, the retrofocus lenses of the invention are well-suited to the manufacture of compact, light weight, projection televisions and monitors which employ pixelized panels. The lenses have flat fields, can be used at f/numbers faster than f/2.4, and can cover extremely wide fields, e.g., total projection angles of, for example, 94°, with minimal vignetting and extremely good correction of all aberrations. Distortion can be controlled to less than 0.2% and primary and secondary lateral color can be as low as one third of a pixel over the range of 0.44–0.64 microns. An MTF in excess of 80% at the pixel frequency can be achieved over the entire field. The lenses can also achieve a high level of thermal stability.

Although specific embodiments of the invention have been described and illustrated, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | ac | 447.5631 | 6.50000 | ACRYLIC | 77.95 |
| 2 | ac | 18.9921 | 24.42521 | | 47.80 |
| 3 | ac | −98.7960 | 5.00000 | ACRYLIC | 42.86 |
| 4 | ac | 25.7576 | 18.20150 | | 36.06 |
| 5 | | −238.2862 | 2.80000 | S-PHM52 | 37.80 |
| 6 | | 46.1970 | 10.00000 | S-LAH60 | 39.09 |
| 7 | | −66.8182 | 29.35394 | | 39.18 |
| 8 | | ∞ | 30.00000 | | 25.34 |
| 9 | | Aperture stop | 4.81498 | | 15.67 |
| 10 | | ∞ | 5.70000 | | 16.81 |
| 11 | | 748.1551 | 6.80000 | S-FPL51 | 18.76 |
| 12 | | −14.4385 | 1.20000 | S-LAH65 | 19.41 |
| 13 | | 410.3233 | 0.20000 | | 21.87 |
| 14 | | 52.5480 | 6.80000 | S-BSM28 | 23.29 |
| 15 | | −26.1804 | 0.20000 | | 24.24 |
| 16 | | −3176.8780 | 1.20000 | S-LAH65 | 24.19 |
| 17 | | 19.7141 | 9.00000 | S-FPL51 | 24.16 |
| 18 | | −45.6452 | 0.20000 | | 25.22 |
| 19 | | 27.0537 | 6.50000 | S-NSL3 | 26.45 |
| 20 | | −105.1618 | 4.00000 | | 25.92 |
| 21 | | ∞ | 30.50000 | BK7 | 23.79 |
| 22 | | ∞ | 4.00000 | | 16.97 |
| 23 | | ∞ | 3.00000 | S-FSL5 | 15.65 |
| 24 | | ∞ | 0.43488 | | 14.99 |

Symbol Description
a - Polynomial asphere
c - Conic section
Focal Shift −0.02285

Conics

| Surface Number | Constant |
|---|---|
| 1 | −1.0000E+00 |
| 2 | −1.0000E+00 |
| 3 | −1.0000E+00 |
| 4 | −1.0000E+00 |

Even Polynomial Aspheres

| Surf. No. | D | E | F | G | H | I |
|---|---|---|---|---|---|---|
| 1 | 2.1969E−06 | 2.9936E−11 | −2.6514E−15 | −2.0313E−17 | −5.2891E−20 | 2.9129E−23 |
| 2 | 3.5159E−07 | 2.7713E−09 | 1.9561E−11 | 6.0035E−15 | −1.2653E−17 | −1.1696E−20 |
| 3 | −7.5100E−06 | 8.6419E−09 | 1.4519E−11 | −2.3027E−14 | −2.9317E−17 | 3.9803E−20 |
| 4 | 8.6601E−06 | −2.9508E−08 | 1.1144E−10 | 3.5937E−14 | −5.5560E−16 | 4.6766E−19 |

First Order Data

| | | | |
|---|---|---|---|
| f/number | 2.00 | Overall Length | 829.957 |
| Magnification | −0.0104 | Forward Vertex Distance | 210.831 |
| Object Height | −714.34 | Barrel Length | 210.396 |
| Object Distance | −619.126 | Entrance Pupil Distance | 29.4171 |
| Effective Focal Length | 6.74119 | Exit Pupil Distance | −1121.05 |
| Image Distance | 0.434879 | Stop Diameter | 14.750 |
| Stop Surface Number | 9 | Distance to Stop | 0.00 |

First Order Properties of Elements

| Element Number | Surface Numbers | | Power | f' |
|---|---|---|---|---|
| 1 | 1 | 2 | −0.24771E−01 | −40.370 |
| 2 | 3 | 4 | −0.24489E−01 | −40.835 |
| 3 | 5 | 6 | −0.16092E−01 | −62.145 |
| 4 | 6 | 7 | 0.29489E−01 | 33.911 |
| 5 | 11 | 12 | 0.35084E−01 | 28.503 |
| 6 | 12 | 13 | −0.58011E−01 | −17.238 |
| 7 | 14 | 15 | 0.34344E−01 | 29.117 |
| 8 | 16 | 17 | −0.41253E−01 | −24.241 |
| 9 | 17 | 18 | 0.34546E−01 | 28.947 |
| 10 | 19 | 20 | 0.23774E−01 | 42.063 |

TABLE 1-continued

First-Order Properties of Doublets

| Element Number | | Surface Numbers | | Power | f |
|---|---|---|---|---|---|
| 3 | 4 | 5 | 7 | 0.14629E−01 | 68.358 |
| 5 | 6 | 11 | 13 | −0.22706E−01 | −44.042 |
| 8 | 9 | 16 | 18 | −0.39951E−02 | −250.31 |

First Order Properties of the Lens

| Power | f |
|---|---|
| 0.14834 | 6.7412 |

TABLE 2

| Surf. No. | Type | Radius | Thickness | Glass | Clear Aperture Diameter |
|---|---|---|---|---|---|
| 1 | a | 292.4304 | 5.00000 | ACRYLIC | 78.14 |
| 2 | ac | 18.5443 | 24.93000 | | 51.05 |
| 3 | ac | −130.7688 | 6.00000 | ACRYLIC | 46.99 |
| 4 | ac | 38.0111 | 39.84000 | | 40.31 |
| 5 | | 160.1220 | 12.20000 | S-LAM55 | 48.02 |
| 6 | | −40.9980 | 3.10000 | S-TIH13 | 48.02 |
| 7 | | −75.7390 | 26.89000 | | 47.90 |
| 8 | | ∞ | 23.80000 | | 40.00 |
| 9 | | Aperture stop | 6.00000 | | 16.17 |
| 10 | | ∞ | 16.71000 | | 16.80 |
| 11 | | −143.4720 | 8.20000 | S-FPL51 | 24.65 |
| 12 | | −17.1970 | 1.59000 | S-LAH64 | 25.82 |
| 13 | | −39.4480 | 2.50000 | | 28.92 |
| 14 | | 40.1860 | 8.00000 | S-PHM52 | 34.01 |
| 15 | | −75.7190 | 0.30000 | | 33.91 |
| 16 | | 68.6180 | 1.84000 | S-LAH52 | 32.37 |
| 17 | | 18.2460 | 12.50000 | S-FPL51 | 29.31 |
| 18 | | −59.6370 | 3.94200 | | 29.26 |
| 19 | | ∞ | 25.00000 | S-BSL7 | 30.00 |
| 20 | | ∞ | 3.00000 | | 30.00 |
| 21 | | ∞ | 3.00000 | S-FSL5 | 24.00 |
| 22 | | ∞ | 0.48300 | | 24.00 |
| 23 | | ∞ | 0.00073 | | 24.00 |

Symbol Description
a - Polynomial asphere
c - Conic section
Focal Shift −0.04300

Conics

| Surface Number | Constant |
|---|---|
| 2 | −6.0000E−01 |
| 3 | −1.1260E+02 |
| 4 | −4.0000E−01 |

Even Polynomial Aspheres

| Surf. No. | D | E | F | G | H | I |
|---|---|---|---|---|---|---|
| 1 | 1.6442E−06 | 2.2304E−10 | −6.6167E−13 | 1.7362E−16 | 1.3400E−19 | −3.9567E−23 |
| 2 | −5.0929E−06 | −1.2402E−08 | 2.1502E−11 | −1.3932E−14 | −9.7603E−17 | 9.3406E−20 |
| 3 | −1.8351E−05 | 9.1143E−09 | 1.7214E−11 | −8.5963E−15 | −1.3592E−17 | 8.3751E−21 |
| 4 | −3.9702E−06 | 6.5420E−09 | 2.3357E−11 | 4.2269E−14 | −8.6816E−17 | 4.1483E−21 |

First Order Data

| | | | |
|---|---|---|---|
| f/number | 2.39 | Overall Length | 913.676 |
| Magnification | −0.0144 | Forward Vertex Distance | 234.826 |
| Object Height | −739.65 | Barrel Length | 234.825 |
| Object Distance | −678.850 | Entrance Pupil Distance | 30.0774 |
| Effective Focal Length | 10.2394 | Exit Pupil Distance | −1014.92 |
| Image Distance | 0.729327E−03 | Stop Diameter | 16.167 |
| Stop Surface Number | 9 | Distance to Stop | 0.00 |

TABLE 2-continued

| Object space f/number | −165.41 |
|---|---|

First Order Properties of Elements

| Element Number | Surface Numbers | | Power | f' |
|---|---|---|---|---|
| 1 | 1 | 2 | −0.24777E−01 | −40.360 |
| 2 | 3 | 4 | −0.16956E−01 | −58.976 |
| 3 | 5 | 6 | 0.22851E−01 | 43.761 |
| 4 | 6 | 7 | −0.80323E−02 | −124.50 |
| 5 | 11 | 12 | 0.26054E−01 | 38.382 |
| 6 | 12 | 13 | −0.25143E−01 | −39.773 |
| 7 | 14 | 15 | 0.22996E−01 | 43.486 |
| 8 | 16 | 17 | −0.31803E−01 | −31.444 |
| 9 | 17 | 18 | 0.33762E−01 | 29.619 |

First-Order Properties of Doublets

| Element Number | | Surface Numbers | | Power | f' |
|---|---|---|---|---|---|
| 3 | 4 | 5 | 7 | 0.14685E−01 | 68.098 |
| 5 | 6 | 11 | 13 | −0.31040E−04 | −32217. |
| 8 | 9 | 16 | 18 | 0.37728E−02 | 265.05 |

First Order Properties of the Lens

| Power | f' |
|---|---|
| 0.97662E−01 | 10.239 |

TABLE 3

| Surf. No. | Type | Radius | Thickness | Glass | Clear Aperture Diameter |
|---|---|---|---|---|---|
| 1 | a | 165.1257 | 5.00000 | ACRYLIC | 81.90 |
| 2 | ac | 20.9729 | 25.17902 | | 54.30 |
| 3 | ac | −487.0656 | 7.00000 | ACRYLIC | 49.57 |
| 4 | ac | 24.7445 | 36.49893 | | 41.73 |
| 5 | | 312.8584 | 17.00000 | S-BAH28 | 51.23 |
| 6 | | −31.9325 | 3.00000 | S-TIH10 | 51.58 |
| 7 | | −58.8083 | 25.92929 | | 52.87 |
| 8 | | ∞ | 24.00000 | | 34.55 |
| 9 | | Aperture stop | 8.50000 | | 21.56 |
| 10 | | ∞ | 15.55149 | | 21.34 |
| 11 | | −180.0000 | 4.00000 | S-FPL51 | 27.83 |
| 12 | | −68.8387 | 0.82098 | | 28.99 |
| 13 | | −160.0000 | 8.80000 | S-FPL51 | 29.60 |
| 14 | | −21.5804 | 1.40000 | S-LAH55 | 30.56 |
| 15 | | −56.2356 | 0.30000 | | 33.56 |
| 16 | | 45.2733 | 9.00000 | S-BSM16 | 37.36 |
| 17 | | −91.0958 | 0.30000 | | 37.26 |
| 18 | | 56.0000 | 1.70000 | S-LAH55 | 35.60 |
| 19 | | 20.3047 | 13.50000 | S-FPL51 | 32.34 |
| 20 | | −69.6734 | 3.50000 | | 32.13 |
| 21 | | ∞ | 1.50000 | S-BSL7 | 30.32 |
| 22 | | ∞ | 1.00000 | | 29.99 |
| 23 | | ∞ | 25.00000 | S-BAL35 | 29.65 |
| 24 | | ∞ | 1.00000 | | 24.41 |
| 25 | | ∞ | 1.50000 | S-BSL7 | 24.07 |
| 26 | | ∞ | 2.55000 | | 23.75 |
| 27 | | ∞ | 0.70000 | S-BSL7 | 22.89 |
| 28 | | ∞ | 0.48081 | | 22.73 |

Symbol Description
a - Polynomial asphere
c - Conic section
Focal Shift −0.04000

TABLE 3-continued

Conics

| Surface Number | Constant |
|---|---|
| 2 | −6.0000E−01 |
| 3 | −1.1260E+02 |
| 4 | −4.0000E−01 |

Even Polynomial Aspheres

| Surf. No. | D | E | F | G | H | I |
|---|---|---|---|---|---|---|
| 1 | 1.1118E−06 | 7.0652E−10 | −3.8482E−13 | −1.3640E−16 | 6.7221E−20 | 1.2999E−23 |
| 2 | −2.1782E−06 | −2.2941E−09 | 7.5490E−12 | 7.2025E−15 | −1.4488E−17 | −2.0320E−20 |
| 3 | −8.0401E−06 | 3.8691E−09 | 3.2911E−12 | −6.4601E−15 | −1.6056E−17 | 1.6963E−20 |
| 4 | −3.7959E−06 | 6.5386E−09 | −2.1568E−11 | 3.2886E−14 | 6.2530E−18 | −6.8868E−20 |

First Order Data

| | | | |
|---|---|---|---|
| f/number | 2.00 | Overall Length | 897.646 |
| Magnification | −0.0152 | Forward Vertex Distance | 244.711 |
| Object Height | −741.81 | Barrel Length | 244.230 |
| Object Distance | −652.936 | Entrance Pupil Distance | 32.5912 |
| Effective Focal Length | 10.4400 | Exit Pupil Distance | −2711.51 |
| Image Distance | 0.480811 | Stop Diameter | 20.322 |
| Stop Surface Number | 9 | Distance to Stop | 0.00 |

First Order Properties of Elements

| Element Number | Surface Numbers | | Power | f |
|---|---|---|---|---|
| 1 | 1 | 2 | −0.20318E−01 | −49.218 |
| 2 | 3 | 4 | −0.21064E−01 | −47.475 |
| 3 | 5 | 6 | 0.24601E−01 | 40.649 |
| 4 | 6 | 7 | −0.10012E−01 | −99.879 |
| 5 | 11 | 12 | 0.45252E−02 | 220.98 |
| 6 | 13 | 14 | 0.20405E−01 | 49.008 |
| 7 | 14 | 15 | −0.23529E−01 | −42.500 |
| 8 | 16 | 17 | 0.20074E−01 | 49.817 |
| 9 | 18 | 19 | −0.25780E−01 | −38.790 |
| 10 | 19 | 20 | 0.30121E−01 | 33.200 |

First-Order Properties of Doublets

| Element Number | | Surface Numbers | | Power | f |
|---|---|---|---|---|---|
| 3 | 4 | 5 | 7 | 0.14287E−01 | 69.996 |
| 6 | 7 | 13 | 15 | −0.37869E−02 | −264.06 |
| 9 | 10 | 18 | 20 | 0.55851E−02 | 179.05 |

First Order Properties of the Lens

| Power | f |
|---|---|
| 0.95786E−01 | 10.440 |

TABLE 4

| Surf. No. | Type | Radius | Thickness | Glass | Clear Aperture Diameter |
|---|---|---|---|---|---|
| 1 | a | 195.6475 | 5.00000 | ACRYLIC | 80.37 |
| 2 | ac | 17.4828 | 25.58000 | | 51.05 |
| 3 | ac | −1053.4370 | 6.00000 | ACRYLIC | 47.37 |
| 4 | ac | 27.7420 | 35.79000 | | 40.74 |
| 5 | | 186.9600 | 16.04000 | S-BAH27 | 50.14 |
| 6 | | −34.2170 | 3.10000 | S-TIH1 | 50.36 |
| 7 | | −60.3350 | 31.48000 | | 51.11 |
| 8 | | ∞ | 24.00000 | | 29.94 |
| 9 | | Aperture stop | 5.84000 | | 17.47 |
| 10 | | −133.9000 | 3.00000 | S-BSL7 | 17.83 |
| 11 | | −77.6800 | 15.92000 | | 18.38 |

TABLE 4-continued

| | | | | |
|---|---|---|---|---|
| 12 | −220.0750 | 7.60000 | S-FPL52 | 24.78 |
| 13 | −17.8280 | 1.56000 | S-LAH65 | 25.66 |
| 14 | −43.8930 | 2.44000 | | 28.61 |
| 15 | 47.7700 | 7.70000 | S-PHM53 | 33.32 |
| 16 | −56.1830 | 0.25000 | | 33.45 |
| 17 | 67.4800 | 1.83000 | S-LAH51 | 32.06 |
| 18 | 18.8300 | 12.00000 | S-FPL51 | 29.42 |
| 19 | −57.1350 | 4.00000 | | 29.40 |
| 20 | ∞ | 25.00000 | S-BSL7 | 27.70 |
| 21 | ∞ | 3.00000 | | 23.01 |
| 22 | ∞ | 3.00000 | FSL3 | 22.15 |
| 23 | ∞ | 0.48073 | | 21.56 |

Symbol Description
a - Polynomial asphere
c - Conic section
Focal Shift −0.04800

Conics

| Surface Number | Constant |
|---|---|
| 2 | −6.0000E−01 |
| 3 | −1.1260E+02 |
| 4 | −4.0000E−01 |

Even Polynomial Aspheres

| Surf. No. | D | E | F | G | H | I |
|---|---|---|---|---|---|---|
| 1 | 7.3528E−07 | 4.7642E−10 | −4.1052E−13 | 1.0980E−17 | 9.3193E−20 | −9.4722E−24 |
| 2 | −4.4618E−06 | −1.7205E−08 | 2.2879E−11 | −2.1340E−14 | −7.7601E−17 | 5.6963E−20 |
| 3 | −1.8536E−05 | 3.4871E−09 | 1.6303E−11 | 9.0823E−15 | −1.9046E−17 | −3.3423E−21 |
| 4 | −1.4416E−05 | 2.2218E−08 | −2.0216E−12 | −1.1200E−14 | 2.4330E−16 | −4.1398E−19 |

First Order Data

| | | | |
|---|---|---|---|
| f/number | 2.39 | Overall Length | 959.002 |
| Magnification | −0.0133 | Forward Vertex Distance | 240.611 |
| Object Height | −805.70 | Barrel Length | 240.130 |
| Object Distance | −718.391 | Entrance Pupil Distance | 29.8221 |
| Effective Focal Length | 9.92766 | Exit Pupil Distance | −1162.89 |
| Image Distance | 0.480728 | Stop Diameter | 16.464 |
| Stop Surface Number | 9 | Distance to Stop | 0.00 |

First Order Properties of Elements

| Element Number | Surface Numbers | | Power | f |
|---|---|---|---|---|
| 1 | 1 | 2 | −0.25481E−01 | −39.245 |
| 2 | 3 | 4 | −0.18301E−01 | −54.642 |
| 3 | 5 | 6 | 0.23662E−01 | 42.261 |
| 4 | 6 | 7 | −0.86923E−02 | −115.04 |
| 5 | 10 | 11 | 0.28522E−02 | 350.61 |
| 6 | 12 | 13 | 0.23846E−01 | 41.936 |
| 7 | 13 | 14 | −0.26197E−01 | −38.172 |
| 8 | 15 | 16 | 0.22786E−01 | 43.886 |
| 9 | 17 | 18 | −0.29749E−01 | −33.614 |
| 10 | 18 | 19 | 0.33346E−01 | 29.989 |

First-Order Properties of Doublets

| Element Number | | Surface Numbers | | Power | f |
|---|---|---|---|---|---|
| 3 | 4 | 5 | 7 | 0.14768E−01 | 67.712 |
| 6 | 7 | 12 | 14 | −0.30140E−02 | −331.78 |
| 9 | 10 | 17 | 19 | 0.52758E−02 | 189.55 |

First Order Properties of the Lens

| Power | f |
|---|---|
| 0.10073 | 9.9277 |

TABLE 5

| Surf. No. | Type | Radius | Thickness | Glass | Clear Aperture Diameter |
|---|---|---|---|---|---|
| 1 | a | 79.2403 | 4.67000 | ACRYLIC | 81.17 |
| 2 | ac | 21.0583 | 27.64496 | | 54.33 |
| 3 | ac | −683.1154 | 4.00000 | ACRYLIC | 51.02 |
| 4 | ac | 22.0582 | 43.41221 | | 43.52 |
| 5 | | 283.8626 | 8.00000 | S-LAM54 | 51.47 |
| 6 | | −69.0131 | 33.34872 | | 51.57 |
| 7 | | ∞ | 24.36300 | | 29.13 |
| 8 | | Aperture stop | 6.00000 | | 17.07 |
| 9 | | ∞ | 15.43399 | | 18.33 |
| 10 | | −225.2536 | 8.60000 | S-FPL51 | 25.30 |
| 11 | | −17.7460 | 1.40000 | S-LAH64 | 26.46 |
| 12 | | −42.0341 | 3.67465 | | 29.42 |
| 13 | | 47.7023 | 8.50000 | S-FPL51 | 34.73 |
| 14 | | −50.3413 | 0.30000 | | 34.91 |
| 15 | | 51.0000 | 1.70000 | S-LAH64 | 33.40 |
| 16 | | 19.1644 | 12.00000 | S-FPL51 | 30.56 |
| 17 | | −79.2360 | 3.73000 | | 30.36 |
| 18 | | ∞ | 25.00000 | S-BSL7 | 28.80 |
| 19 | | ∞ | 0.22000 | | 23.89 |
| 20 | | ∞ | 3.00000 | FSL3 | 23.82 |
| 21 | | ∞ | 5.77146 | | 23.21 |

Symbol Description
a - Polynomial asphere
c - Conic section
Focal Shift −0.01713

Conics

| Surface Number | Constant |
|---|---|
| 2 | −6.0000E−01 |
| 3 | −1.1260E+02 |
| 4 | −4.0000E−01 |

Even Polynomial Aspheres

| Surf. No. | D | E | F | G | H | I |
|---|---|---|---|---|---|---|
| 1 | −1.6329E−07 | 8.8081E−10 | −5.7917E−13 | −9.2387E−17 | 1.4153E−19 | −2.7383E−23 |
| 2 | 1.7372E−06 | −1.4922E−09 | 6.9657E−12 | 4.7138E−15 | −1.0140E−17 | −1.2935E−20 |
| 3 | −4.9706E−06 | −2.3089E−09 | 4.1290E−12 | 6.3611E−15 | −8.5788E−18 | 4.9547E−22 |
| 4 | −9.5107E−06 | −1.1104E−08 | −2.1062E−12 | 2.8865E−14 | 3.7704E−17 | −1.0790E−19 |

First Order Data

| | | | |
|---|---|---|---|
| f/number | 2.39 | Overall Length | 998.428 |
| Magnification | −0.0127 | Forward Vertex Distance | 240.769 |
| Object Height | −845.30 | Barrel Length | 234.998 |
| Object Distance | −757.659 | Entrance Pupil Distance | 36.0035 |
| Effective Focal Length | 10.0787 | Exit Pupil Distance | −1570.55 |
| Image Distance | 5.77146 | Stop Diameter | 16.117 |
| Stop Surface Number | 8 | Distance to Stop | 0.00 |

First Order Properties of Elements

| Element Number | Surface Numbers | | Power | f' |
|---|---|---|---|---|
| 1 | 1 | 2 | −0.16760E−01 | −59.666 |
| 2 | 3 | 4 | −0.23151E−01 | −43.194 |
| 3 | 5 | 6 | 0.13569E−01 | 73.696 |
| 4 | 10 | 11 | 0.26232E−01 | 38.121 |
| 5 | 11 | 12 | −0.25130E−01 | −39.794 |
| 6 | 13 | 14 | 0.19764E−01 | 50.597 |
| 7 | 15 | 16 | −0.25187E−01 | −39.703 |
| 8 | 16 | 17 | 0.30990E−01 | 32.269 |

TABLE 5-continued

First-Order Properties of Doublets

| Element Number | Surface Numbers | | Power | f |
|---|---|---|---|---|
| 4 | 5 | 10 | 0.39717E−03 | 2517.8 |
| 7 | 8 | 15 | | |
| | | 12 | | |
| | | 17 | 0.66151E−02 | 151.17 |

First Order Properties of the Lens

| Power | f |
|---|---|
| 0.99219E−01 | 10.079 |

TABLE 6

| Material | Catalog | N | V | Q |
|---|---|---|---|---|
| Acrylic | PLASTICS | 1.491738 | 57.4 | 120.0 |
| S-PHM52 | OHARA | 1.617998 | 63.3 | 45.0 |
| S-LAH60 | OHARA | 1.833995 | 37.1 | −34.0 |
| S-FPL51 | OHARA | 1.496998 | 81.5 | 120.0 |
| S-LAH65 | OHARA | 1.803996 | 46.6 | −40.0 |
| S-BSM28 | OHARA | 1.617719 | 49.8 | 6.3 |
| S-NSL3 | OHARA | 1.518227 | 58.9 | 11.0 |
| S-BAH27 | OHARA | 1.701533 | 41.2 | 0.5 |
| S-TIH1 | OHARA | 1.717357 | 29.5 | 31 |
| S-BSL7 | OHARA | 1.516328 | 64.1 | −6.8 |
| S-FPL52 | OHARA | 1.455998 | 90.3 | 140 |
| S-PHM53 | OHARA | 1.602999 | 65.4 | 38.0 |
| S-LAH51 | OHARA | 1.785892 | 44.2 | −33 |
| S-LAM55 | OHARA | 1.761997 | 40.1 | −4.9 |
| S-TIH13 | OHARA | 1.740764 | 27.8 | 44 |
| S-LAH64 | OHARA | 1.78798 | 47.3 | −40 |
| S-LAH52 | OHARA | 1.799512 | 42.2 | −31 |
| S-BAH28 | OHARA | 1.723416 | 37.9 | 6.7 |
| S-LAH55 | OHARA | 1.834803 | 42.7 | −42 |
| S-BSM16 | OHARA | 1.620409 | 60.3 | 7.2 |
| S-TIH10 | OHARA | 1.728245 | 28.4 | 37.0 |
| S-LAM54 | OHARA | 1.756995 | 47.8 | −39.0 |

TABLE 7

| Ex. | $f_0$ | $f_{U1}$ | $f_{U2}$ | BFL | BFL/$f_0$ | $S_{1-2}$ | $S_{1-2}/f_0$ | $S_{1-AS}$ | $S_{1-AS}/f_0$ |
|---|---|---|---|---|---|---|---|---|---|
| 1 | 6.74 | −59.95 | 29.16 | 30.47 | 4.5 | 69.86 | 10.4 | 59.35 | 8.8 |
| 2 | 10.24 | 123.83 | 38.57 | 25.94 | 2.5 | 56.69 | 5.5 | 50.69 | 5.0 |
| 3 | 10.44 | 207.44 | 40.29 | 26.55 | 2.5 | 73.98 | 7.1 | 49.93 | 4.8 |
| 4 | 9.93 | 161.01 | 39.23 | 25.86 | 2.6 | 61.32 | 6.2 | 55.48 | 5.6 |
| 5 | 10.08 | 566.05 | 38.31 | 28.11 | 2.8 | 79.14 | 7.9 | 57.71 | 5.7 |

TABLE 8A

| Ex. | $LC_{red-blue}^1$ (microns) | $LC_{red-green}^1$ (microns) | $LC_{blue-green}^1$ (microns) | $LC_{blue-green}^2$ (microns) |
|---|---|---|---|---|
| 1 | 0.2 | 5.8 | 5.6 | 3.9 |
| 2 | 0.2 | 2.3 | 2.5 | 1.8 |
| 3 | 1.7 | 3.4 | 5.1 | 3.2 |
| 4 | 0.3 | 1.7 | 2.1 | 0.9 |
| 5 | 2.7 | 4.3 | 1.6 | 1.5 |

TABLE 8B

| Ex. | $LC_{red-blue}/f_0^1$ (×10³) | $LC_{red-green}/f_0^1$ (×10³) | $LC_{blue-green}/f_0^1$ (×10³) | $LC_{blue-green}/f_0^2$ (×10³) |
|---|---|---|---|---|
| 1 | 0.03 | 0.86 | 0.04 | 0.58 |
| 2 | 0.02 | 0.22 | 0.24 | 0.18 |
| 3 | 0.16 | 0.33 | 0.49 | 0.31 |
| 4 | 0.03 | 0.17 | 0.21 | 0.09 |
| 5 | 0.27 | 0.43 | 0.16 | 0.15 |

[1] Over full field in the short conjugate focal plane.
[2] Over 95% of the full field in the short conjugate focal plane.

TABLE 9

| Ex. | $D_{max}^1$ (%) | $D_{min}^1$ (%) | $\|D_{max} - D_{min}\|^1$ (%) | FOV (degrees) | Vignetting (%) |
|---|---|---|---|---|---|
| 1 | 0.06 | −0.06 | 0.12 | 94.6 | 32 |
| 2 | 0.19 | 0.09 | 0.10 | 91.8 | 19 |
| 3 | 0.16 | −0.14 | 0.30 | 93.8 | 27 |
| 4 | 0.21 | 0.09 | 0.13 | 93.6 | 16 |
| 5 | 0.15 | −0.14 | 0.29 | 93.0 | 29 |

[1] Over the half field-to-full field range; the magnitude of the distortion was less than 0.25% throughout the field for each of Examples 1–5.

TABLE 10

| | Ex. 1 | Ex. 2 | Ex. 3 | Ex. 4 | Ex. 5 |
|---|---|---|---|---|---|
| | U1 | | | | |
| | $L_{U1/N1}$ | | | | |
| $f_{U1/N1}$ | −40.4 | −40.3 | −49.2 | −39.2 | −59.9 |
| F/#$_{U1/N1}$ | 0.52 | 0.52 | 0.60 | 0.49 | 0.74 |

TABLE 10-continued

|  | Ex. 1 | Ex. 2 | Ex. 3 | Ex. 4 | Ex. 5 |
|---|---|---|---|---|---|
| $V_{U1/N1}$ | 57.4 | 57.4 | 57.4 | 57.4 | 57.4 |
| $Q_{U1/N1}$ | 120.0 | 120.0 | 120.0 | 120.0 | 120.0 |
| $L_{U1/N2}$ | | | | | |
| $f_{U1/N2}$ | −40.9 | −59.0 | −47.5 | −54.6 | −43.4 |
| $F/\#_{U1/N2}$ | 0.95 | 1.26 | 0.96 | 1.15 | 0.85 |
| $V_{U1/N2}$ | 57.4 | 57.4 | 57.4 | 57.4 | 57.4 |
| $Q_{U1/N2}$ | 120.0 | 120.0 | 120.0 | 120.0 | 120.0 |
| $L_{U1/P}$ | | | | | |
| $f_{U1/P}$ | 33.9 | 43.7 | 40.6 | 42.5 | 74.1 |
| $Q_{U1/P}$ | 45.0 | −4.9 | 6.7 | 0.5 | −39.0 |
| $N_{U1/P}$ | 1.617998 | 1.761997 | 1.723416 | 1.701533 | 1.756995 |
| $V_{U1/P}$ | 63.3 | 40.1 | 37.9 | 41.2 | 47.8 |
| $L_{U1/N3}$ | | | | | |
| $f_{U1/N3}$ | −62.2 | −124.4 | −99.9 | −115.9 | — |
| $N_{U1/N3}$ | 1.833995 | 1.740764 | 1.728245 | 1.717357 | — |
| U2 | | | | | |
| $L_{U2/P1}$ | | | | | |
| $f_{U2/P1}$ | 28.5 | 38.5 | 49.1 | 42.0 | 38.2 |
| $Q_{U2/P1}$ | 120.0 | 120.0 | 120.0 | 140.0 | 120.0 |
| $L_{U2/P2}$ | | | | | |
| $f_{U2/P2}$ | 29.0 | 29.7 | 33.2 | 30.1 | 32.4 |
| $Q_{U2/P2}$ | 120.0 | 120.0 | 120.0 | 120.0 | 120.0 |
| $L_{U2/P3}$ | | | | | |
| $f_{U2/P3}$ | — | 43.6 | — | 44.0 | 50.7 |
| $Q_{U2/P3}$ | — | 45.0 | — | 38.0 | 120.0 |
| Clear Apertures | | | | | |
| $CA_{max/U2}$ | 26.5 | 34.0 | 37.4 | 33.5 | 34.9 |
| $CA_{min/U1}$ | 36.1 | 40.3 | 41.7 | 40.7 | 43.5 |
| $CA_{max/U2}/CA_{min/U1}$ | 0.73 | 0.84 | 0.90 | 0.82 | 0.80 |

What is claimed is:

1. A projection lens for forming an enlarged image of a pixelized panel on a screen, said projection lens having an optical axis, a long conjugate side, a short conjugate side, and an effective focal length $f_0$, said lens, in order from the long conjugate side to the short conjugate side, comprising:

(I) a first lens unit comprising a plurality of lens elements one of which has an optical surface $S_1$ which constitutes the short conjugate end of the first lens unit, said plurality of lens elements having a minimum clear aperture $CA_{min/U1}$ and comprising:

(A) a lens element $L_{U1/N1}$ which:
 (i) comprises at least one aspheric surface,
 (ii) comprises a plastic material having a V-value $V_{U1/N1}$ and a Q-value $Q_{U1/N1}$,
 (iii) has a focal length $f_{U1/N1}$,
 (iv) has a lens element f-number $F/\#_{U1/N1}$, and
 (v) has a short conjugate surface which is concave towards the short conjugate side;

(B) a lens element $L_{U1/N2}$ which:
 (i) comprises at least one aspheric surface,
 (ii) comprises a plastic material having a V-value $V_{U1/N2}$ and a Q-value $Q_{U1/N2}$,
 (iii) has a focal length $f_{U1/N2}$, and
 (iv) has a lens element f-number $F/\#_{U1/N2}$; and (C) a lens element $L_{U1/P}$ which:
 (i) comprises a glass material having a Q-value $Q_{U1/P}$, and
 (ii) has a focal length $f_{U1/P}$; and (II) a second lens unit having a positive power, said lens unit comprising a plurality of lens elements one of which has an optical surface $S_2$ which constitutes the long conjugate end of the second lens unit, said plurality of lens elements having a maximum clear aperture $CA_{max/U2}$ and comprising a lens element $L_{U2/P1}$ which:

(i) comprises a glass material have a Q-value $Q_{U2/P1}$, and
(ii) has a focal length $f_{U2/P1}$;

wherein:
(a) the first and second lens units are the only lens units of the projection lens;
(b) the first lens unit does not include any lens elements which comprise a glass material having a Q-value greater than 50.0;
(c) the projection lens has a field of view in the direction of the long conjugate which is greater than or equal to 85 degrees;
(d) the projection lens is telecentric on the short conjugate side;
(e) the projection lens has an effective back focal length BFL which satisfies the relationship:

$BFL/f_0 \geq 2.0$;

(f) the projection lens has a mechanical spacing $S_{1-2}$ between $S_1$ and $S_2$ which satisfies the relationship:

$S_{1-2}/f_0 \geq 3.5$, where the mechanical spacing is the smaller of the center-to-center distance and the edge-to-edge distance between $S_1$ and $S_2$ for an unfolded optical axis; and (g) $f_{U1/N1}$, $F/\#_{U1/N1}$, $V_{U1/N1}$, $Q_{U1/N1}$, $f_{U1/N2}$, $F/\#_{U1/N2}$, $V_{U1/N2}$, $Q_{U1/N2}$, $f_{U1/P}$, $Q_{U1/P}$, $f_{U2/P1}$, $Q_{U2/P1}$, $C_{min/U1}$, and $C_{max/U2}$ satisfy the relationships:

$$f_{U1/N1} < 0$$

$$F/\#_{U1/N1} \leq 1.0;$$

$$V_{U1/N1} \geq 45;$$

$$Q_{U1/N1} \geq 100.0;$$

$$f_{U1/N2} < 0;$$

$$F/\#_{U1/N2} \leq 1.5;$$

$$V_{U1/N2} \geq 45;$$

$$Q_{U1/N2} \geq 100.0;$$

$$f_{U1/P} > 0;$$

$$Q_{U1/P} \leq 50.0;$$

$$f_{U2/P1} > 0;$$

$$Q_{U2/P1} \geq 35.0;$$

and $$CA_{max/U2}/CA_{min/U1} \leq 1.0.$$

2. The projection lens of claim 1 wherein the $L_{U1/N2}$ lens element is biconcave.

3. The projection lens of claim 1 wherein the $L_{U1/N1}$ lens element and/or the $L_{U1/N2}$ lens element comprises two aspheric surfaces.

4. The projection lens of claim 1 wherein the glass material of the $L_{U1/P}$ lens element has an index of refraction $N_{U1/P}$ which satisfies the relationship:

$$N_{U1/P} \geq 1.6.$$

5. The projection lens of claim 1 wherein the glass material of the $L_{U1/P}$ lens element has a V-value $V_{U1/P}$ which satisfies the relationship:

$$V_{U1/P} \leq 75.$$

6. The projection lens of claim 1 wherein the plurality of lens elements of the first lens unit comprises a lens element $L_{U1/N3}$ which:
  (i) comprises a glass material, and
  (ii) has a focal length $f_{U1/N3}$,
where $f_{U1/N3}$ satisfies the relationships:

$$f_{U1/N3} < 0.$$

7. The projection lens of claim 6 wherein the glass material of $L_{U1/N3}$ has an index of refraction $N_{U1/N3}$ which satisfies the relationship:

$$N_{U1/N3} \leq 1.9.$$

8. The projection lens of claim 6 wherein lens elements $L_{U1/P}$ and $L_{U1/N3}$ are in the form of a cemented doublet.

9. The projection lens of claim 1 wherein the plurality of lens elements of the second lens unit comprises a lens element $L_{U2/P2}$ which:
  (i) comprises a glass material having a Q-value $Q_{U2/P2}$, and
  (ii) has a focal length $f_{U2/P2}$,
where $f_{U2/P2}$ and $Q_{U2/P2}$ satisfy the relationships:

$$f_{U2/P2} > 0;$$

and $$Q_{U2/P2} \geq 35.0.$$

10. The projection lens of claim 9 wherein the plurality of lens elements of the second lens unit comprises a lens element $L_{U2/P3}$ which:
  (i) comprises a glass material having a Q-value $Q_{U2/P3}$, and
  (ii) has a focal length $f_{U2/P3}$,
where $f_{U2/P3}$ and $Q_{U2/P3}$ satisfy the relationships:

$$f_{U2/P3} > 0;$$

and $$Q_{U2/P3} \geq 35.0.$$

11. The projection lens of claim 1, 9, or 10 wherein:

$$Q_{U2/P1} \geq 45.0.$$

12. The projection lens of claim 1, 9, or 10 wherein:

$$Q_{U2/P1} \geq 100.0.$$

13. The projection lens of claim 9 or 10 wherein:

$$Q_{U2/P2} \geq 45.0.$$

14. The projection lens of claim 9 or 10 wherein:

$$Q_{U2/P2} \geq 100.0.$$

15. The projection lens of claim 10 wherein:

$$Q_{U2/P3} \geq 45.0.$$

16. The projection lens of claim 10 wherein:

$$Q_{U2/P3} \geq 100.0.$$

17. The projection lens of claim 1 wherein the lens has a lateral color LC in its short conjugate focal plane which satisfies the relationships:

$$LC_{red-blue} \leq 0.0003 * f_0,$$

$$LC_{red-green} \leq 0.0009 * f_0,$$

and $$LC_{blue-green} \leq 0.0006 * f_0,$$

where (i) the red-blue and red-green relationships are satisfied over the full field in the short conjugate focal plane, (ii) the blue-green relationship is satisfied over at least 95% of the full field in the short conjugate focal plane, and (iii) the red, green, and blue wavelengths are 0.64 micrometers, 0.55 micrometers, and 0.44 micrometers, respectively.

18. The projection lens of claim 1 wherein the projection lens has a percentage distortion D which:
  (i) over the full field has a magnitude that is less than or equal to 1.0; and
  (ii) over the half field-to-full field range has a maximum value $D_{max}$ and a minimum value $D_{min}$ which satisfy the relationship:

$$|D_{max} - D_{min}| \leq 0.4.$$

19. The projection lens of claim 1 wherein the lens exhibits no more than 35 percent vignetting at its working f-number, said working f-number being less than or equal to 2.4.

20. The projection lens of claim 1 further comprising a reflective surface for folding the projection lens' optical axis, said reflective surface being between the first lens unit and the second lens unit.

21. The projection lens of claim 20 wherein the projection lens comprises an aperture stop between the reflective surface and the second lens unit.

22. The projection lens of claim 21 wherein the spacing $S_{1-AS}$ between the center of $S_1$ and the center of the aperture stop satisfies the relationship:

$$S_{1-AS}/f_0 \geq 3.0$$

23. The projection lens of claim 1 wherein an axial marginal ray traced through the projection lens from the projection lens' short conjugate focal plane intersects each lens surface of the projection lens at an angle of incidence that is greater than or equal to 1.5 degrees except for (i) the lens surfaces of $L_{U1/N1}$ and (ii) any lens surfaces which are on the long conjugate side of $L_{U1/N1}$ for which the angle of incidence may be greater than, less than, or equal to 1.5 degrees.

24. A projection lens system comprising:
(a) a pixelized panel; and
(b) the projection lens of claim 1.

25. The projection lens systems of claim 24 further comprising an illumination system which comprises a light source and illumination optics which forms an image of the light source.

26. A projection lens for forming an enlarged image of a pixelized panel on a screen, said projection lens having an optical axis, a long conjugate side, a short conjugate side, and an effective focal length $f_0$, said lens, in order from the long conjugate side to the short conjugate side, comprising:

(I) a first lens unit comprising a plurality of lens elements one of which has an optical surface $S_1$ which constitutes the short conjugate end of the first lens unit, said plurality of lens elements having a minimum clear aperture $CA_{min/U1}$ and consisting of:
  (A) a lens element $L_{U1/N1}$ which:
    (i) comprises at least one aspheric surface,
    (ii) comprises a plastic material having a V-value $V_{U1/N1}$ and a Q-value $Q_{U1/N1}$,
    (iii) has a focal length $f_{U1/N1}$,
    (iv) has a lens element f-number $F/\#_{U1/N1}$, and
    (v) has a short conjugate surface which is concave towards the short conjugate side;
  (B) a lens element $L_{U1/N2}$ which:
    (i) comprises at least one aspheric surface,
    (ii) comprises a plastic material having a V-value $V_{U1/N2}$ and a Q-value $Q_{U1/N2}$,
    (iii) has a focal length $f_{U1/N2}$,
    (iv) has a lens element f-number $F/\#_{U1/N2}$, and
    (v) has a biconcave form;
  (C) a lens element $L_{U1/P}$ which:
    (i) comprises a glass material having a V-value $V_{U1/P}$, a Q-value $Q_{U1/P}$, and an index of refraction $N_{U1/P}$; and
    (ii) has a focal length $f_{U1/P}$; and
  (D) a lens element $L_{U1/N3}$ which:
    (i) comprises a glass material having an index of refraction $N_{U1/N3}$, and
    (ii) has a focal length $f_{U1/N3}$,
(II) a reflective surface for folding the projection lens' optical axis; and
(III) a second lens unit having a positive power, said lens unit comprising a plurality of lens elements one of which has an optical surface $S_2$ which constitutes the long conjugate end of the second lens unit, said plurality of lens elements having a maximum clear aperture $CA_{max/U2}$ and comprising:
  (A) a lens element $L_{U2/P1}$ which:
    (i) comprises a glass material have a Q-value $Q_{U2/P1}$, and
    (ii) has a focal length $f_{U2/P1}$; and
  (B) a lens element $L_{U2/P2}$ which:
    (i) comprises a glass material having a Q-value $Q_{U2/P2}$, and
    (ii) has a focal length $f_{U2/P2}$,
wherein:
(a) the first and second lens units are the only lens units of the projection lens;
(b) the $L_{U1/N1}$ lens element and/or the $L_{U1/N2}$ lens element comprises two aspheric surfaces;
(c) the lens elements $L_{U1/P}$ and $L_{U1/N3}$ are in the form of a cemented doublet;
(d) the projection lens has a field of view in the direction of the long conjugate which is greater than or equal to 85 degrees;
(e) the projection lens is telecentric on the short conjugate side;
(f) the projection lens has an effective back focal length BFL which satisfies the relationship:

$$BFL/f_0 \geq 2.0;$$

(g) the projection lens has a mechanical spacing $S_{1-2}$ between $S_1$ and $S_2$ which satisfies the relationship:

$$S_{1-2}/f_0 \geq 3.5,$$

where the mechanical spacing is the smaller of the center-to-center distance and the edge-to-edge distance between $S_1$ and $S_2$ for an unfolded optical axis; and (h) $f_{U1/N1}$, $F/\#_{U1/N1}$, $V_{U1/N1}$, $Q_{U1/N1}$, $f_{U1/N2}$, $F/\#_{U1/N2}$, $V_{U1/N2}$, $Q_{U1/N2}$, $f_{U1/P}$, $Q_{U1/P}$, $N_{U1/P}$, $V_{U1/P}$, $f_{U1/N3}$, $N_{U1/N3}$, $f_{U2/P1}$, $Q_{U2/P1}$, $f_{U2/P2}$, $Q_{U2/P2}$, $C_{min/U1}$, and $C_{max/U2}$ satisfy the relationships:

$$f_{U1/N1} < 0;$$

$$F/\#_{U1/N1} \leq 1.0;$$

$$V_{U1/N1} \geq 45;$$

$$Q_{U1/N1} \geq 100.0;$$

$$f_{U1/N2} < 0;$$

$$F/\#_{U1/N2} \leq 1.5;$$

$$V_{U1/N2} \geq 45;$$

$$Q_{U1/N2} \geq 100.0;$$

$$f_{U1/P} > 0;$$

$$Q_{U1/P} \leq 50.0;$$

$$N_{U1/P} \geq 1.6;$$

$$V_{U1/P} \leq 75;$$

$$f_{U1/N3} < 0;$$

$$N_{U1/N3} \leq 1.9;$$

$$f_{U2/P1} > 0;$$

$Q_{U2/P1} \geq 35.0$;

$f_{U2/P2} \geq 0$;

$Q_{U2/P2} \geq 35.0$;

and $CA_{max/U2}/CA_{min/U1} \leq 1.0$.

27. The projection lens of claim 26 wherein $L_{U1/P}$ is on the short conjugate side of $L_{U1/N3}$.

28. The projection lens of claim 26 wherein $L_{U1/P}$ is on the long conjugate side of $L_{U1/N3}$.

29. The projection lens of claim 26 wherein the plurality of lens elements of the second lens unit comprises a lens element $L_{U2/P3}$ which:
   (i) comprises a glass material having a Q-value $Q_{U2/P3}$, and
   (ii) has a focal length $f_{U2/P3}$,
where $f_{U2/P3}$ and $Q_{U2/P3}$ satisfy the relationships:

$f_{U2/P3} > 0$;

and $Q_{U2/P3} \geq 35.0$.

30. The projection lens of claim 26 wherein the lens has a lateral color LC in its short conjugate focal plane which satisfies the relationships:

$LC_{red-blue} \leq 0.0003 * f_0$, $LC_{red-green} \leq 0.0009 * f_0$, and $LC_{blue-green} \leq 0.0006 * f_0$, where (i) the red-blue and red-green relationships are satisfied over the full field in the short conjugate focal plane, (ii) the blue-green relationship is satisfied over at least 95% of the full field in the short conjugate focal plane, and (iii) the red, green, and blue wavelengths are 0.64 micrometers, 0.55 micrometers, and 0.44 micrometers, respectively.

31. The projection lens of claim 26 wherein the projection lens has a percentage distortion D which:
   (i) over the full field has a magnitude that is less than or equal to 1.0; and
   (ii) over the half field-to-full field range has a maximum value $D_{max}$ and a minimum value $D_{min}$ which satisfy the relationship:

$|D_{max} - D_{min}| \leq 0.4$.

32. The projection lens of claim 26 wherein the lens exhibits no more than 35 percent vignetting at its working f-number, said working f-number being less than or equal to 2.4.

33. A projection lens system comprising:
   (a) a pixelized panel; and
   (b) the projection lens of claim 26.

34. The projection lens systems of claim 33 further comprising an illumination system which comprises a light source and illumination optics which forms an image of the light source.

* * * * *

UNITED STATES PATENT AND TRADEMARK OFFICE
CERTIFICATE OF CORRECTION

PATENT NO. : 7,145,729 B2
APPLICATION NO. : 11/194322
DATED : December 5, 2006
INVENTOR(S) : Melvyn H. Kreitzer It is certified that error appears in the above-identified patent and that said Letters Patent is hereby corrected as shown below:

In Col. 2, line 66, after "linear" delete "5,".

In Col. 5, line 3, delete "abberated" and insert -- aberrated --, therefor.

In Col. 7, line 50, delete "$f_{U1/N1} \leqq 0$" and insert -- $f_{U1/N1} < 0$ --, therefor, In Col 8, line 28, delete "$|f_{U1/N3}/f_0 \geqq 9.0).$" and insert -- $|f_{U1/N3}//f_0 \geqq 9.0).$ --, therefor.

In Col. 28, in (Table 8B), line 34, delete "$LC_{blue-green} f_0^2$" and insert -- $LC_{blue-green}/f_0^2$ --, therefor.

In Col. 31, line 4, in Claim 1, after "$f_{U1/N1} < 0$" insert -- ; --.

In Col. 33, line 12, in Claim 22, after "$S_{1-AS}/f_0 \geqq 3.0$" insert -- . --.

In Col. 35, line 3, n Claim 26, delete "$f_{U2/P2} \geqq 0;$" and insert -- $f_{U2/P2} > 0$ --, therefor.

Signed and Sealed this

Twenty-seventh Day of March, 2007

JON W. DUDAS
*Director of the United States Patent and Trademark Office*